United States Patent [19]

Davis et al.

[11] Patent Number: 4,939,689

[45] Date of Patent: Jul. 3, 1990

[54] OUTLINE-DRIVEN DATABASE EDITING AND RETRIEVAL SYSTEM

[75] Inventors: Mary L. Davis; David Rose, both of Brookline; Michael D. Barrow, Somerville, all of Mass.

[73] Assignee: Crowninshield Software, Inc., Boston, Mass.

[21] Appl. No.: 37,384

[22] Filed: Apr. 9, 1987

[51] Int. Cl.$^5$ .............................................. G06F 15/40
[52] U.S. Cl. .................................. 364/900; 364/974.4; 364/300; 364/927.2; 364/962.1
[58] Field of Search ................ 364/200 MS File, 300, 364/900 MS File

[56] References Cited

U.S. PATENT DOCUMENTS 4,688,195  8/1987  Thompson et al. ................. 364/300
4,751,674  6/1988  Aoyagi et al. ....................... 364/900
4,754,326  6/1988  Kram et al. .......................... 364/900

OTHER PUBLICATIONS

*Database Processing: Fundamentals, Design, Implementation,* Kroenke, ©1983, pp. 42–45, 192–197, 210–219, 242–283, 286–331.

*Mastering Think Tank on the 512K Macintosh,* by Kamin, copyrighted 1986.

*Primary Examiner*—Lawrence E. Anderson
*Attorney, Agent, or Firm*—Robert K. Tendler

[57] ABSTRACT

A relational database is created and queried through the use of an outliner-style text editor which permits automatic generation of data entry forms for the creation of records. Data entry and editing are simplified and errors are minimized because changes in the outline are automatically reflected in the data entry forms and thus the automatically updated records. Data retrieval is driven through the manipulation of the outline to allow simple and complex queries without utilizing a database programming language. A specialized global field is utilized in which identical field names may be repetitively inserted into several databases. In the data entry mode, a global value can be set and that value is automatically inserted into each database record containing that global field as they are created so that relations are made automatically within the various databases. In the data retrieval mode, the global field can be used to control the display of the outline to truncate the outline to only those categories and fields containing data for a specific global field value, thereby to display only relevant outline portions. A field mapper allows the operator to immediately see the changes in the outline and direct old fields to new names or positions and indicate new fields which are to be inserted into the existing records, all prior to execution of the changed outline in terms of data entry. The query mode features a continually displayed outline in an Outline Window.

1 Claim, 29 Drawing Sheets

TO PRODUCE HARD COPY

Press Ctrl G or select GLOBAL/INSERT

FIG. 4g

```
+ Outline
  + first
    - alpha 1
    - beta 1
    - gamma 1
256 →  [▨▨▨▨]
  + second
    - alpha 2
    - beta 2
    - gamma 2
    - !omega
  + third
    - !omega
```

FIG. 4h

```
+ Outline
  + first
    - alpha 1
    - beta 1
    - gamma 1
258 →  [!omega]
  + second
    - alpha 2
    - beta 2
    - gamma 2
    - !omega
  + third
    - !omega
```

Field Mapper Sequence

OUTLINE-DRIVEN DATABASE EDITING AND RETRIEVAL SYSTEM

FIELD OF INVENTION

This invention relates to computer systems, and more particularly to an outliner-driven data entry and data retrieval system for use in database management.

BACKGROUND

It has been common to make use of outliners in document preparation systems such as Lotus Manuscript TM and Microsoft Word TM. These systems are considered advanced word processing systems intended for the production of hardcopy documents. Outliners have also come into common use as so-called "thought processors" such as the Living Videotex program Thinktank TM. However these systems limit the user to outline editing only as opposed to using the outline for defining any database structure. While the Living Videotex follow up program More TM allows the user to perform simple time-management operations and organizational chart preparation in addition to simple outlining, none of the above outliners directly control a complex relational database or permit rearrangement thereof without complex database language reprogramming.

Note, with respect to word processors, these produce "linear" documents which have a clear beginning and end. All word processors provide simple word search and locate features but they perform these functions by locating the word searched in terms of its distance from the beginning of a document. This is a time-consuming scroll search function. Thus they lack advanced key word searching and word occurrence indices.

Also to full-text systems used in on-line and CD-ROM applications, they are constructed in a conventional word processing manner as linear documents having a clear beginning and clear end, with a table of contents. Although these systems use word occurrence indices for information retrieval, the index is invariant and prefabricated.

Thus, in all linear document systems, each selected word is located in the linear document solely from its distance from the beginning of the document. The context in which a particular word is used cannot be stated in a logical expression such as those used in database management systems, thereby making full-text or other linear document systems quite distinct from relational database management systems. Note a relational database is one in which there are one or more databases, each of which contain multiple fields having multiple records; and relations can be made between the fields of the databases. What this means is that in prior full-text or linear document databases, one cannot look for the occurrence of a word in a given field in a particular database, but rather the prior art linear document systems define the position of the word in the document by, for instance, stating how many characters to move from the beginning of the document.

Having discussed common linear document systems and their relative inflexibility as compared with relational database systems, common relational database capabilities nonetheless impose severe limitations. One of the most severe limits to relational database use is the requirement of a complex programming language to define and edit the structure of the database. This programming must be done by a skilled programmer, not the user of the system, which adds cost and complexity both when the database structure is to be changed. Also limits are imposed as to the number of fields per database, the number of records per database, and the number of databases in use during a query operation. Field lengths commonly must be preset to a specific length, typically not greater than 256 characters and must be "predeclared" as a specific type, such as numerical, alpha-numeric, date, or time. Record entry editing is limited to very simple single-line editing operations and commonly allow no carriage returns or text formatting of any kind. Alteration of the structure of such a relational database such as the insertion of a new field, renaming, deletion, or repositioning of an existing field is commonly an extremely cumbersome, if not impossible, operation once data records have been entered into a database. These limits make relational databases unsuitable for use in complex, text-oriented database management tasks.

It should be noted that no relational database management systems utilize an outliner-style text editor for the design of a set of databases and automatic generation of data entry forms. Data entry forms are expressed in a predetermined format and are that which, enable specifying the category definition and structure of the database for data entry. Also, no relational database management system uses an outliner as an interface for querying the database. Outlines reflecting the structure of interrelated databases are simply not utilized.

It should also be noted that so-called text databases commonly support the use of only one database at a time, thereby precluding any true relational operations between databases. Word occurrence indices are often utilized in text databases, but complex, multiple-criteria queries are either not supported or require the use of complex database programming language. Again, outlines are not used for the definition of the database or to perform data retrieval operations.

By way of example of the difficulties in the use of prior relational database systems, and considering the example of a medical student who wishes to construct a database about microbiology, using a common database program like Dbase TM II or III from Ashton Tate, the student must first define his database structures, one database at a time. As the database is defined he must declare the type of field, i.e., alpha-numeric, date, time, or formula, and the field length which is normally limited to a maximum of 256 characters. This field length remains fixed thereafter. As each database is defined, the user has nothing on screen that allows him to view the structure of other databases while he is designing a new one. Normally, users rely on printouts and other visual reminders. Once the structures are established for a set of databases, they cannot be conveniently changed. Thus the addition of new fields, changes of position, or changes of names is inconvenient at best. Databases like those in the Lotus products 1-2-3 TM and Symphony TM only allow changes in the database to occur by having the user go through an arduous process of redefining numerous spread sheet ranges used in database operations and inserting or changing fields in all the ranges. The user interface provides no assistance in this process, so the user must remember that a change is only made when all the steps are gone through. The only assistance offered by the system is to deliver messages to the user that certain functions cannot be performed because the database is incorrectly defined; but no specific information about the nature of the error is given. Because of these restrictions on the structure and definition of the database, the student is severely hampered in the data entry phase, particularly in constructing a database for a complex subject such as microbiology where the student will come across facts for which no adequate database field exists and a change must be made. This frequently requires that the user start over which often results in lost data.

Database users, like the medical student, are most frequently non-programmers. Since common databases require the use of a database programming language to execute queries, non-programmers commonly employ database programmers or computer consultants to design and implement their database applications. Each time the user of a database application wants to ask a query that hasn't been asked before or wants to restructure the response, he must call upon the database programmer to write a query and revise the application. This requirement impacts negatively on user productivity and cost containment.

SUMMARY OF THE INVENTION

In the subject system, it was recognized that an outliner in combination with a powerful text-oriented relational database management system would provide the basis for a powerful computer-based information manipulation environment. In order to solve the above problems involved with textual information manipulation and common database systems, the subject invention includes a full-featured outline editor used to define an outline, and a system for automatically generating data entry forms from the database descriptions reflected in the outline. The subject invention also includes a system for updating database records after structural changes are made to the outline and a system for retrieving information from the databases by utilizing the outline to formulate database queries, providing user flexibility, ease of data entry, and powerful information retrieval without the use of a database programming language.

The first major advantage of the Subject System is the use of the outline itself to define the database structure. Both the presentation to the user of an outline and the use of the outline to control, set, change, or query the database, permit complex database creation and use by non-programmers.

It should be noted that another major advantage of the subject system is that the database structure can be changed without losing data. This obviates the need in the prior art for an "import routine" in which all data is stored separately while database changes are made, at which time all the data is re-entered or "imported" from the temporary storage.

Note, since the system is outline driven, it takes advantage of the operator's understanding of the original structure of a topic and displays this structure at all times, so that the interrelationship between data elements of a particular topic is immediately accessible both to the person entering in the data and also to the person retrieving the data.

It will be noted that an outline is commonly utilized to define the structure of whole bodies of knowledge. Because an outline has an inherent tree-type structure, it is possible for an expert in a given field to piece together information in a meaningful way which suits the particular subject addressed by that expert. Thus, the use of the outline is one of the easiest ways to organize thoughts or bodies of knowledge and make the structure intelligible to others. It also makes alterations or corrections to the structure less cumbersome and to a certain extent, error-free.

Thus, with respect to database design and data entry, utilization of an outliner-style text editor allows the rapid and simple design of a complex dataset or set of relational databases. The automatic generation of data entry forms from the database definition specified in the outline without the necessity of declaring the type of field, i.e. numerical, alpha-numeric, date, or time, or having to declare the maximum length of a field simplifies the preparation necessary before actual data entry begins. Data is entered into database fields via a text editor which has many of the capabilities of a true word processor. The lack of limits on the size of fields and therefore records provides the utmost flexibility for the operator.

In one embodiment, a specialized global field is utilized in outline definition, data entry, and data retrieval operations. With respect to outline definition, a global field can be used to insert an identical field name into different databases in order to relate information between databases. In data entry, the global field can be assigned a value which is inserted into records automatically as they are created in any database containing that global field. In data retrieval, if a global field is selected as a search criteria field and a criteria value is set for the search, the system automatically displays only those databases and fields which contain a record for that value in the selected global field, thereby helping to eliminate searches which come up with no information and immediately giving the operator a truncated outline which eliminates irrelevant and confusing information.

In one embodiment, a field mapper, placed in operation only when a database record entry has been made and an outline change of that database category has been indicated, allows the operator to immediately see the changes in the outline prior to updating the records, with the option of going back to the outline should the changes be incorrect or incomplete. In the field mapper, field changes in records are accomplished by a mapping function displayed by the field mapper screen, in which a "one-to-one", "one-to-many", or "one-to-nothing" mapping function may be specified. When the operator is satisfied with a change, the field mapper generates an internal list of update tasks to update the records that already exist upon user confirmation. Updating of the records is therefore accomplished only after the operator is satisfied with the outline changes, insuring that no inadvertent loss of data occurs.

With respect to retrieval, the system utilizes a windowed display, having the database outline, or a portion thereof constantly displayed in an Outline Window. A Criteria Window is provided which indicates fields selected as criteria fields and the values assigned as search criteria. A Response Window is also provided in which records matching the selected criteria are displayed. Complex logical expressions can be constructed in the Criteria Window by combining criteria fields and values with logical operators such as AND, OR, and NOT.

Additionally, it should be noted that the system provides the ability to search for the occurrence of a word anywhere within the databases. The system displays the records in which the word is used in the Response Window and simultaneously highlights in the outline the location or database which contains the occurrence in the Outline Window, thus orienting the user to the context in which the word was used.

In summary, without the utilization of a readily accessible outline and the ability to flexibly modify the outline an expert preparing a large complex database is gravely hampered. It is thus extremely advantageous to provide to the operator inputting information in a database with a system which is both flexible enough to permit rapid insertion of data in database records, relate data throughout a long and complicated outline, and to permit the individual formulating the outline to readily change the outline, check the entered changes, and immediately cause the records to be updated to reflect changes in the structure of the outline.

By preservation and display of the outline, the subject system preserves the structure of the information in the database for the user to see. The outline format uniquely eliminates the retrieval of extraneous data characteristic of full-text database systems, if the original outline is produced in such a fashion that it adequately represents the knowledge entered into the database. Since the outline format is capable of providing the individual with a convenient categorization of the knowledge entered, the outline format permits enhanced productivity both of data entry and data retrieval operations.

Thus, the relational database is defined through the use of an outliner-style text editor which permits rapid error-free definition, editing and rearrangement of information in databases, and automatic generation of data entry forms for the creation of records. Data entry and editing are simplified because changes in the outline are automatically reflected in the forms and thus the records. Data retrieval is driven through the manipulation of the outline to allow simple and complex queries without utilizing a database programming language. An outline defines one or more databases each composed of as many as 32,000 fields, each field capable of arbitrary length determined solely by the amount of data entered into individual records and available memory and storage. In addition to text, fields also can contain graphic images. The number of databases in an outline is limited only by available memory. A specialized global field is utilized in which identical field names may be repetitively inserted into several databases within an outline.

In the data entry mode, a global value can be set and that value is automatically inserted into each database record containing that global field as they are created so that relations are made automatically within the various databases. In the data retrieval mode, the global field can be used to control the display of the outline to truncate the outline to only those categories and fields containing data for a specific global field value, thereby displaying only relevant outline portions.

A field mapper allows the operator to immediately see the changes in the outline and direct old fields to new names or positions and indicate new fields which are to be inserted into the existing records.

The query mode features a continually displayed outline in an Outline Window. Also displayed are a Criteria Window and a Response Window. Criteria are specified in the Criteria Window in which one or more fields are assigned specific values for record call-up. Fields are selected in the Outline Window. Records which match criteria are presented in the Response Window. It is a feature of the query mode that the system highlights categories of the outline which include the particular word selected in the Criteria Window to rapidly orient the user as to where in the outline his query resides.

BRIEF DESCRIPTION OF THE DRAWINGS

These and other features of the subject invention are described in connection with the Detailed Description taken in conjunction, with the Drawings of which:

FIGS. 4a-4h are diagrammatic illustrations showing successive screens indicating the repetitive insertion of a global field into an outline;

DETAILED DESCRIPTION

Figure 1:
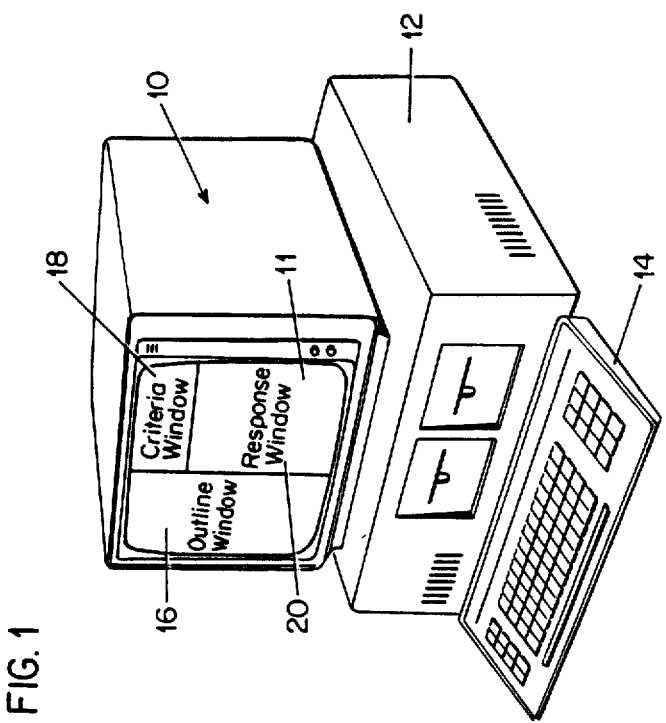
FIG. 1 is a diagrammatic illustration showing a typical personal computer workstation.

Referring now to FIG. 1, in a relational database management system, one embodiment of the subject invention is illustrated to include a personal computer system 10 such as an IBM PC or IBM PC compatible computer running the operating system MD-DOS. A typical system includes a monitor display 11, a CPU 12, which includes disk drive units for storage and a keyboard 14, for user input. In the embodiment shown in FIG. 1, for a query mode, the screen pictured includes an Outline Window 16, in which the system displays the outline, or a portion thereof, created by the user defining the structure of a set of databases, or a dataset. As will be discussed in connection with FIG. 10b, during a query, the outline in the Outline Window is constantly displayed for reference. Monitor screen 11 also includes a Criteria Window 18, in which the user specifies the criteria field or fields and a criteria value or values prior to initiating a query or search. This screen also includes a Response Window 20, in which database records which match the search criteria are displayed.

Figure 2:
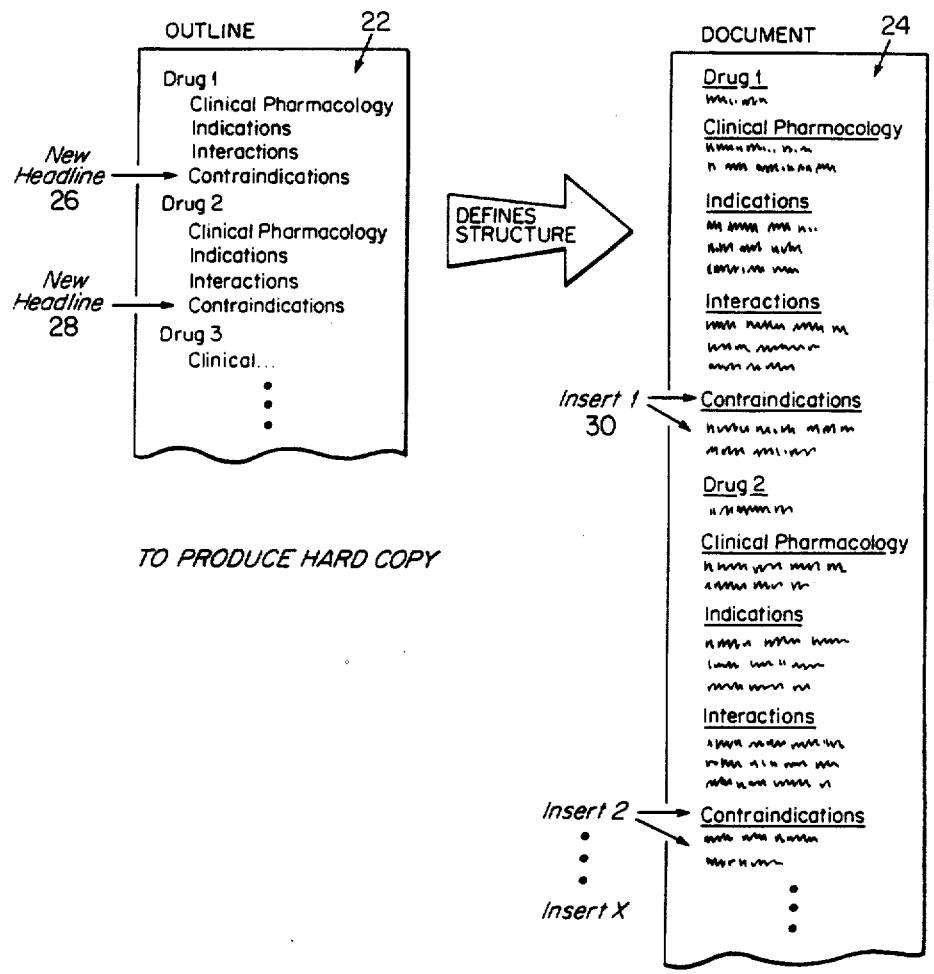
FIG. 2 is a diagrammatic illustration, showing the use of outliners in the prior art of document preparation.

FIG. 2 illustrates one prior art usage of an outliner-style text editor in which an outliner generates an outline 22 which is used in conjunction with a word processor in the preparation of hardcopy documents 24. This Figure depicts the process in which a user, in this case the author of a drug compendium, must go through in order to insert a new section, in this case "Contraindications", into selected portions of document 24. First the user inserts a new heading into the appropriate positions 26 and 28 in the document outline and then the user must scroll through the document and enter text under each "Contraindications" heading 30. As can be seen, this is a cumbersome process. For repetitive entries, errors are commonly made during this transposition process. In short, it is a brute force process which is error-prone.

Figure 3A:
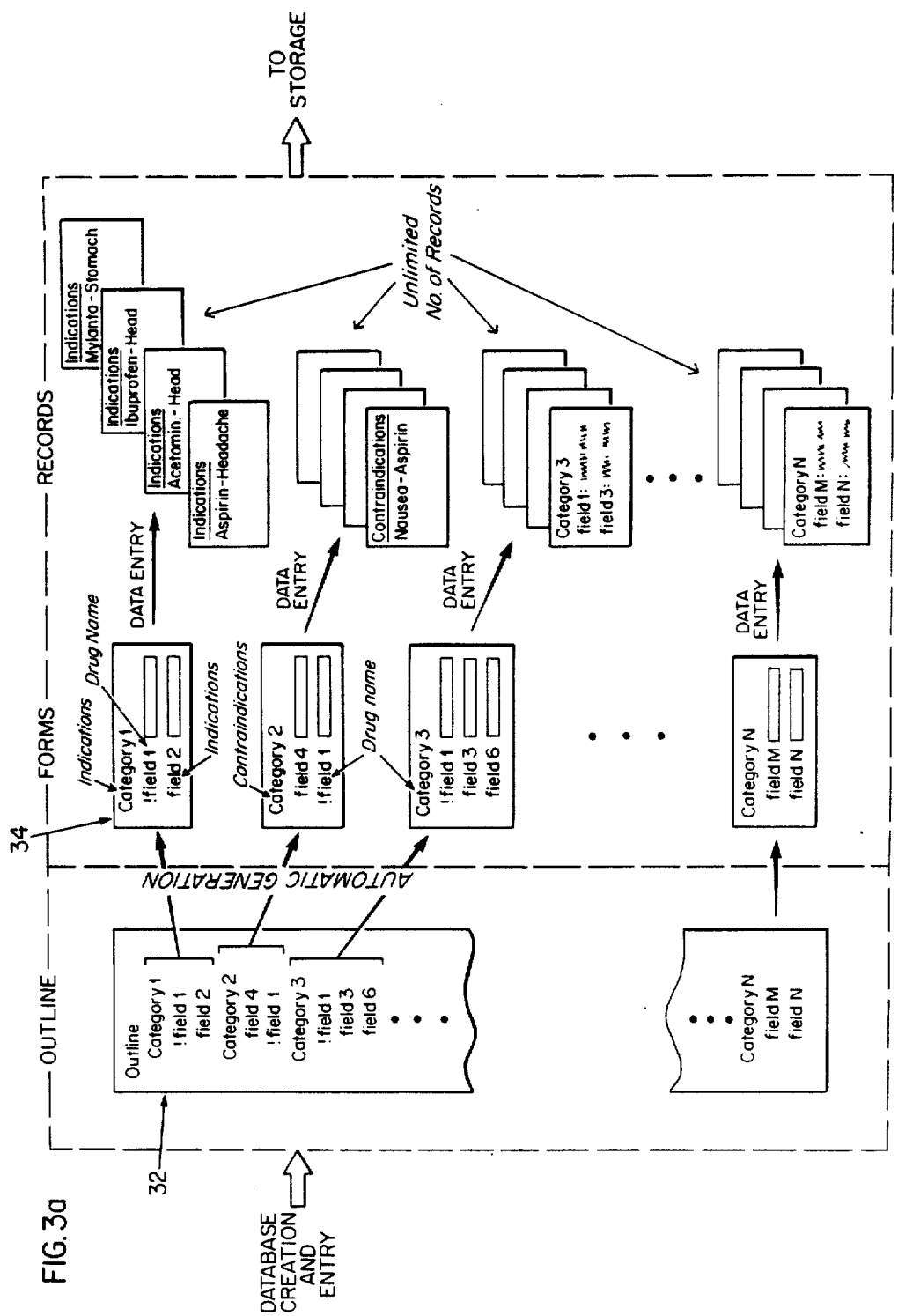
FIG. 3a is a diagrammatic illustration showing the automatic generation of forms from an outline description and the corresponding databases.

In contradistinction, FIG. 3a illustrates how an outliner 32 is utilized by the subject system to automatically generate data entry forms 34. A data entry form is defined as a format by which one can systematically enter records into database files. The data entry forms are used in the creation of one or more records which define the contents of a database. Each form is utilized to define one category in the illustrated embodiment. The automatic outline-to-forms generations process is activated by selecting the "DATABASE/GENERATE" menu option in one embodiment of the system. How this is accomplished will be discussed in connection with FIGS. 3b–3e.

Figure 3B:
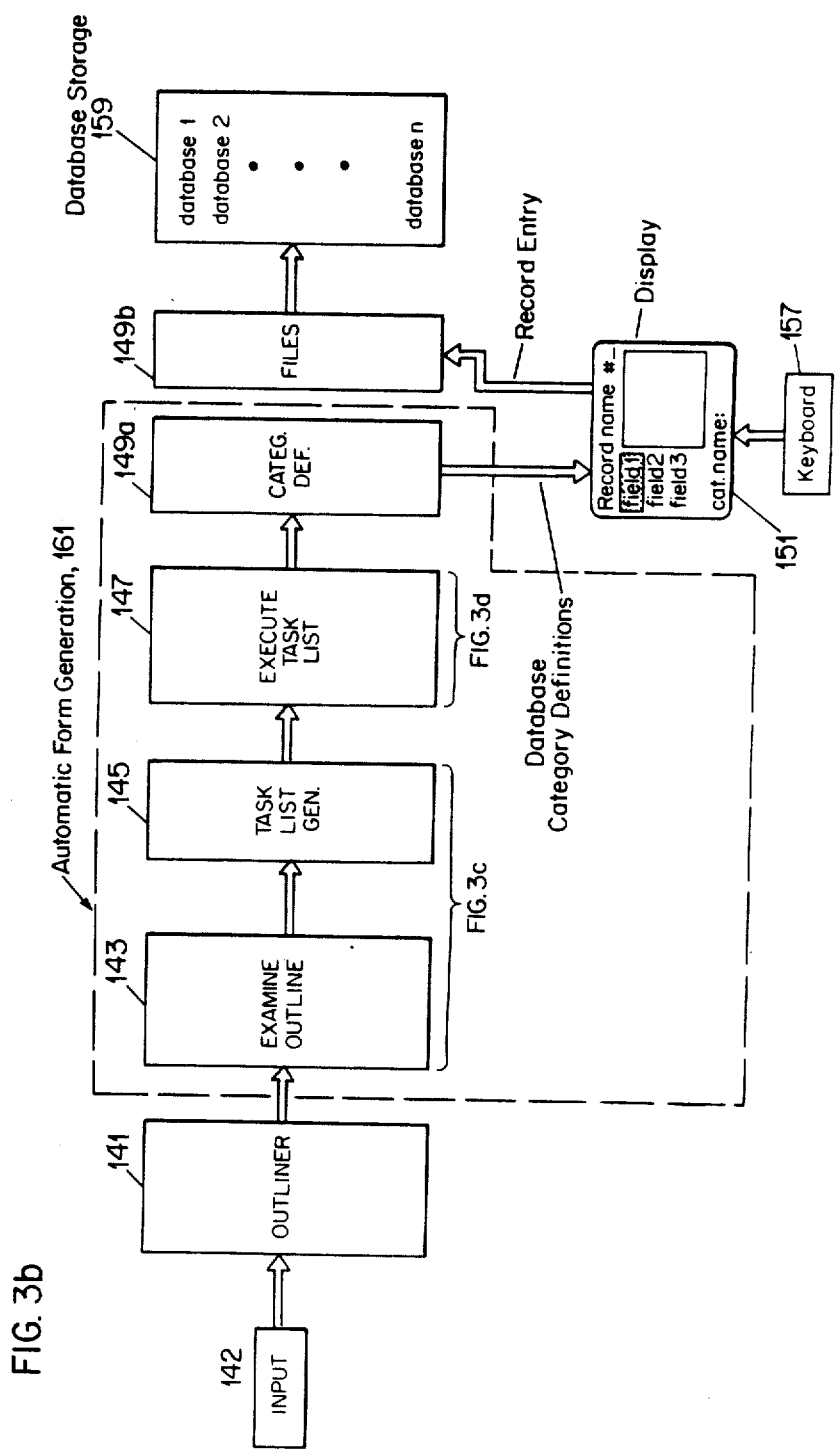
FIG. 3b is a block diagram of this subject automatic form generation.

Referring to FIG. 3b, the automatic forms generation and resulting database creation is accomplished by the read-out of an outliner 141 which defines an outline established at input 142. This is accomplished by a unit 143 which examines the outline and generates a task list at 145 as further discussed in FIG. 3c. Thereafter, the task list is executed at 147 which defines a format in which database category definitions are entered at 149a. Once having entered the category definitions in a predetermined format by a separate forms generation routine, the automatic forms generation of FIG. 3a is completed through the use of a form display routine as discussed in connection with FIG. 3e, which results in a data entry display 151 which displays the format and selected categories to permit creation of records in files as illustrated at 149b. The display includes a Record Entry Window under control of keyboard 157, with record entries provided at 149b to database 159.

Thus, the automatic database definition takes place by the elements within dotted box 161, via automatic form generation from examination of the outline.

In operation, beginning with the root node, i.e., the first headline of the outline, the program uses a series of recursive calls to find nodes that are candidates to be headings for categories. If the candidate is logically valid as described below, a "task", which describes what actions must be done to the various database files, is generated and appended to the task list. This is the "first pass" phase. After the entire outline has been examined and the user did not interrupt the process, each task is performed. This is the "second pass" phase.

In one embodiment, tasks are generated before they are performed because some may take a long time to execute. Any dialogue can take place during the first pass, with minimal delays for execution. Then the user may let the tasks run without constant attention. Also, this prevents a cascading of errors which might otherwise develop in a badly formed outline.

When the outline fails to meet a logical requirement or when an existing category has been changed, a "stop-test" is generated by the Subject System. The portion of the outline in question is highlighted on the screen, and a short message is printed. The user may elect to stop the process, in which case, none of the tasks are performed.

In one embodiment, the transformation process is also activated implicitly when the Database/Record Entry option is selected. In this instance, only the "node" and "leaves" which are related to the specific category defined by the area around the current node are considered. That is, the recursion starts not at the root node, but a node N, where N is the current node or "owner" of the current node if current is a leaf. For the present purposes a "node" is defined as a "headline" in the outline. A "leaf" is defined as a terminal or final branch on the outline. The "owner" of a current node is defined as the closest prior node at a higher level.

While an outline may generally look any way the user desires, there are certain logical constraints. An outline not meeting these constraints is said to be badly formed. Portions of an outline that are badly formed are generally ignored. That is, they do not lead to the construction of a set of database files, although that may have been the intention of the user.

Generally speaking, a node whose children are all leaves defines a valid category. The headings of the leaves become the field names for the category. An exception to this is that the root heading cannot be a category heading because leaves that are meant to be fields cannot exist on level 1, i.e., the second level of the outline.

During generation, a node whose first child has no children becomes a candidate as a category headline. If the candidate fails further tests, i.e., all of the children are not leaves, a stop-test is generated. There are further constraints placed on an outline after it has once been used to generate a database. These are discussed in the database updating discussion concerning the field mapper which follow.

Figure 3C:
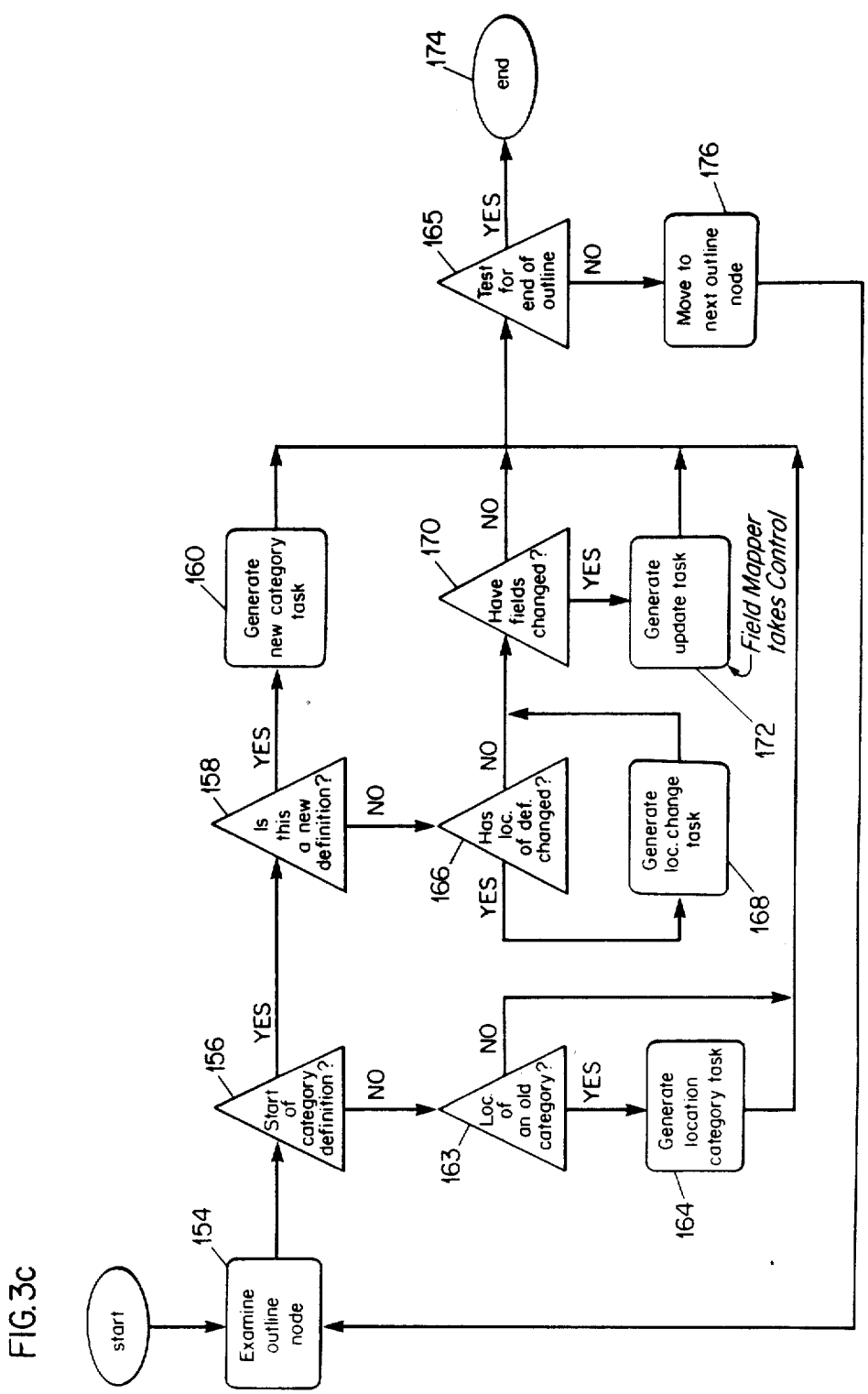
FIG. 3c is a flow diagram of the routine of how form generation proceeds initially and which also examines the outline to determine if any changes have taken place since the outline forms were generated.
Figure 3D:
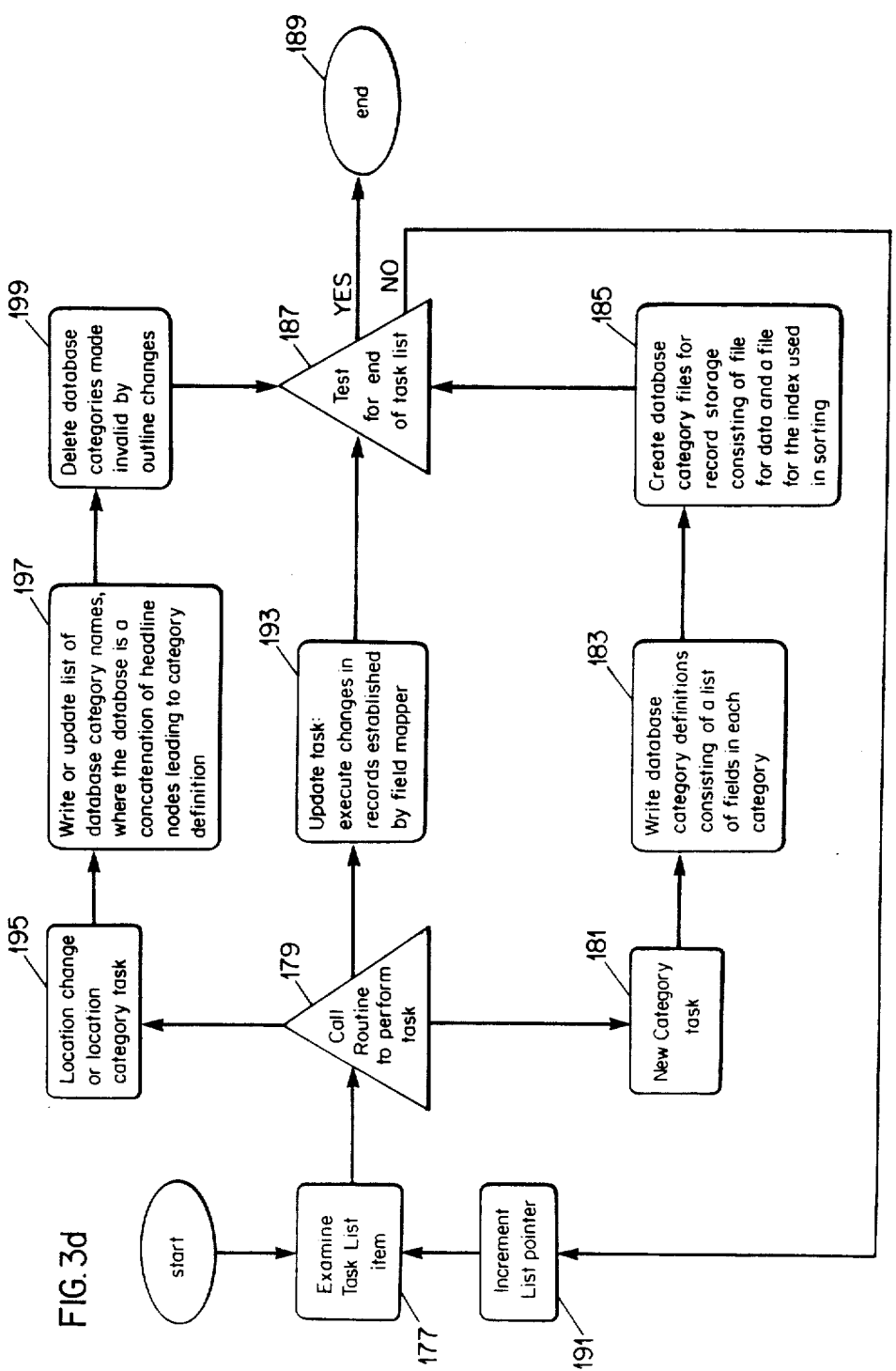
FIG. 3d is a flow diagram illustrating the processing of the task list.

To illustrate how this accomplished, FIG. 3c is a flow diagram of the automatic outline to data entry form generation inspection system which is invoked by "DATABASE/GENERATION" and "DATABASE/RECORD ENTRY" in the illustrated embodiment of the Subject System. The output of this portion of the system is a list of tasks required to create or update the database files necessary for data entry. Each database definition, consisting of a name of the database and the field names, is displayed through the use of a forms routine. This is shown in FIG. 3d. In FIG. 3c, the system starts by examining the first or current outline node at 154 and determines whether this node is the start of a category definition at 156 by determining if it is the "parent" of a "childless child" or a terminating leaf. If yes, the system checks to determine if this will constitute a new category definition at 158, i.e., did this database category exist in a prior database generation. If yes, a "generate new category task" is generated at 160. If the system determines at 156 that a node is not the start of a category definition, the system determines if it is the location of an old category at 163. If yes, the system adds a "generate location category task" at 165 to the task list and passes on to test for the end of the outline at 165. If a node is not the location of an old category at 163, the system passes to the end of outline test at 165. If a node is the start of a category definition at 156, but is not a new definition at 158, the system determines if the node's category definition has changed at 166. If it has, the system generates a "location change task" at 168 and proceeds to determine if any changes have been made to fields at 170. If the location of the definition has not changed at 166, the system proceeds directly to determine field changes at 170. If any field changes have taken place at 170, the system generates an "update task" at 172 which passes control to the field mapper. If no changes have been made to the fields, the system passes directly to the end of outline test at 164. If this node is not the end of the outline, the system moves to the next outline node at 176 which loops to the beginning process at 154. If the node is the end, the system proceeds to the end of the routine at 174 and subsequent updating processes.

When a structural change to the database is necessary, a task is generated, detailed above in the discussion of FIG. 3c. In the illustrated embodiment of the subject invention, a task is represented by a "struct xform-rec," which actually contains one of the four structures defined for each type of task: the New Record Task, referred to in FIG. 3c as the "new category task" at 159; the Modify Desc Task, referred to in FIG. 3c as the "location category task" at 168 and 162; the Modify Fields Task, which invokes the field mapper at 172; and the Lose Records Task, which is not referred to in FIG. 3c, but is implied by way of failing to satisfy the logical constraints of outline structure imposed by the current embodiment of the subject invention. In this case, a database cannot be constructed, even though the user may intend for it to be. That is the reason the system forms a list of tasks to perform at the end of the inspection and requires confirmation from the user to proceed with the actual updating process, in order to minimize the inadvertent loss of data.

These different tasks are defined by the following subordinate structures containing the parameter necessary to actually perform the appropriate tasks:

| | |
|---|---|
| New Record: | Generated when a well formed category has been defined, but its database files have not been created. Parameters are as follows: |
| | struct node *pnode - node marking start of category |
| | char *fname - the base name of database files |
| | char *desc - string that holds recdesc |
| Modify Desc: | The relative location of a category has been changed, so that its category name description must be updated in the fnames database. |
| | char *fname - base name of database files |
| | char *rdesc - string that holds recdesc |
| Modify Fields: | The leaves of a category have been changed in some way. The structure of the category must be modified. |
| | struct node *pnode - node at start of category |
| | struct upd-rec *pupd - the update record |
| | struct rec-hd *oldhd the old form of the category |
| Lose Records: | A node which once marked a category definition has been found, but it is now badly formed (for example, what used to be a leaf is no longer). The database files will be removed. |
| | struct node *pnode - node at start of bad form |

The update process is actually a subset of the transformation process. If during transformation, a node is found which contains a category name, some update function will be called. If an existing category is found, and it is still well formed, it is tested to see if any changes have been made. First, the current record description is compared to the old one found in the fnames database. If they differ, the appropriate task is generated. Then, the structure of category is tested. The old skeleton is set up and is tested against the category as defined in the outline. They may differ in the number of fields, or just in the spelling of the field names. If there is a change, a stop-test is generated, allowing the user to abort the entire generation process. If it is allowed to proceed, the field mapper is invoked to make an update-rec. The "update-rec" is a linked list, which contains, in order, a record for each field of the new version of the category. Each record contains the old position of the field. The field mapper itself presents lists of the old and new fields. The user chooses fields from the old list to be moved into the fields of the new list. When a node is found with a category, but is now badly formed, a "stop-test" is performed, and if allowed, a "lose-record" task is generated to remove the database files that no longer have a valid category definition.

FIG. 3d is a flow diagram illustrating the processing of the task list generated by the routine which analyzes the outline. First, the routine examines the first item or task in the task list 177. Then, the program calls the appropriate routine to execute the task 179. If the item is a new category task, the program calls this routine 181. First, the routine writes the database category definitions 183 which consists of the set of fields in the category and the category name. The category name is simply a concatenation of the headings on nodes leading to the category. For instance, consider the following outline definition:

+Outline example 1
  +Category 1
    +Subcategory x
      -field 1
      -field 2
      -field 3
    +Subcategory y
      -field 4
      -field 5

The database category defined starting at the headline node "Subcategory y" has the fields "field 4" and "field 5" and the name of the database category is defined as "Outline example 1/Category 1/Subcategory y".

After the database category definition is written, the program creates the database files 185 which will store the data records on the storage medium. Each database category has two record files: one is for the actual data entered into the records; the other is an index consisting of the first field of each record. The index is used for sorting the records alphabetically. After the files are created and ready to receive data, the program tests for the end of the task list 187. If the end has been reached, the program proceeds to the end of this routine 189 into the data entry routine of FIG. 3e. If not, the program increments the task list 191 and examines the next item 177.

If the task examined is an update task 177, the program 179 calls the update task routine 193. The operation of this routine is fully discussed in FIG. 8. After the update task is complete, the program tested for the end of the task list 187.

If the task examined is a location change task 195, this routine updates the database category definitions to reflect a change in position of the category in the outline 197. This is done by changing the database category name to the new concatenation of node headlines leading to the new position. If the change in position somehow makes the category invalid, the database category files are deleted 199. The routine then examines the list for the end 187 and proceeds either to the end 189 or increments the list pointer 191 and examines the next item 177.

Figure 3E:
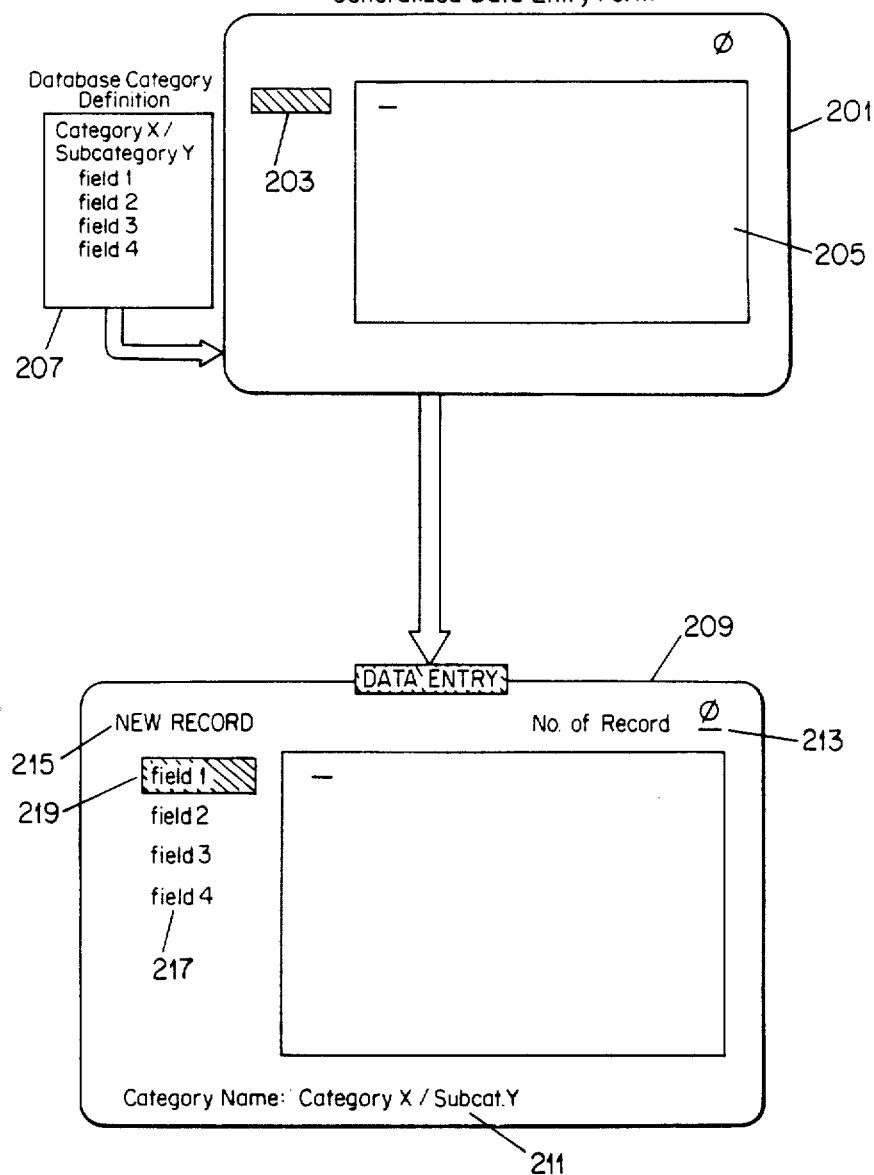
FIG. 3e is a diagrammatic illustration of the data entry form from a database category definition.

FIG. 3e illustrates the generation of the data entry form from a database category definition. The generalized form 201 consists of a field pointer 203 which moves through the list of field names and a Data Editing Window 205 which is used to enter data into fields in records and operates like a rudimentary word processor. A database category 207 is passed to the form routine and the resulting data entry form is generated 209. Note that the database category name is displayed 211, along with the number of records in the database 213, initially zero, the "New Record" indicator 215, and the list of field names 217 with the field pointer 219 positioned on the first field in the database category.

GLOBAL FIELD-OUTLINE DEFINITION

Frequently, users want to make associations between databases equating or comparing the values of fields which reside in different databases. The subject invention facilitates this type of operation through the use of "GLOBAL" fields. Global fields are used in data entry to provide default value settings.

Figure 4A:
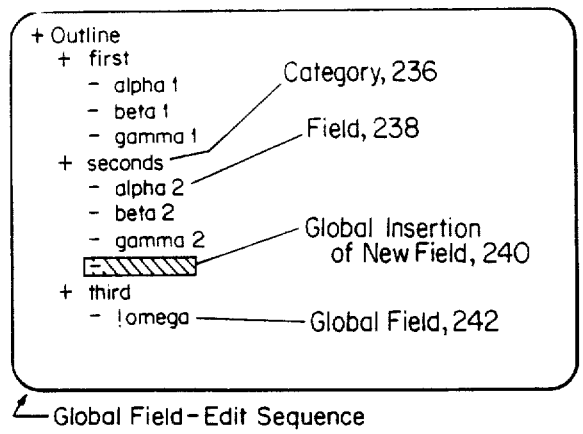
Figure 4B:
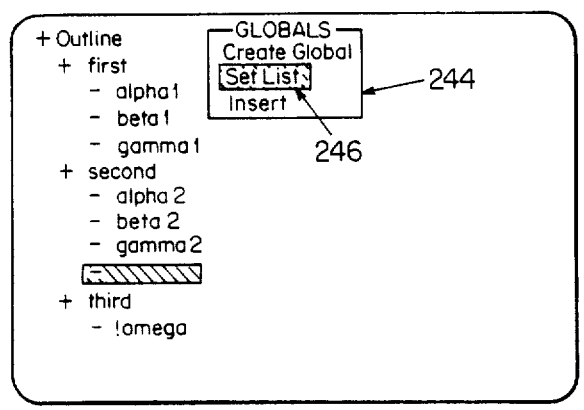
Figure 4C:
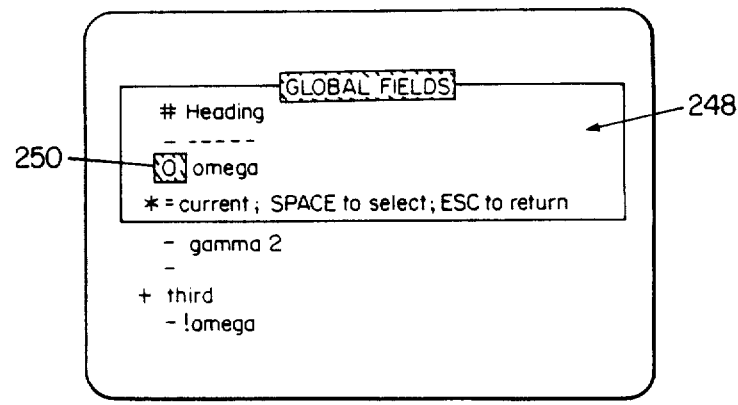
Figure 4D:
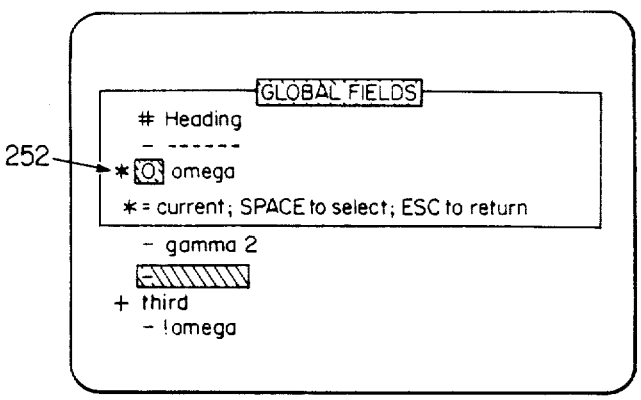
Figure 4E:
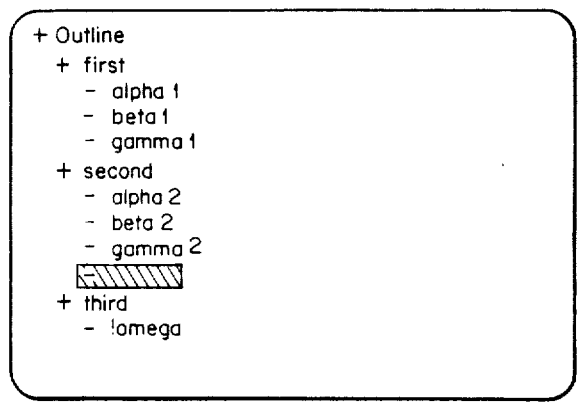
Figure 4F:
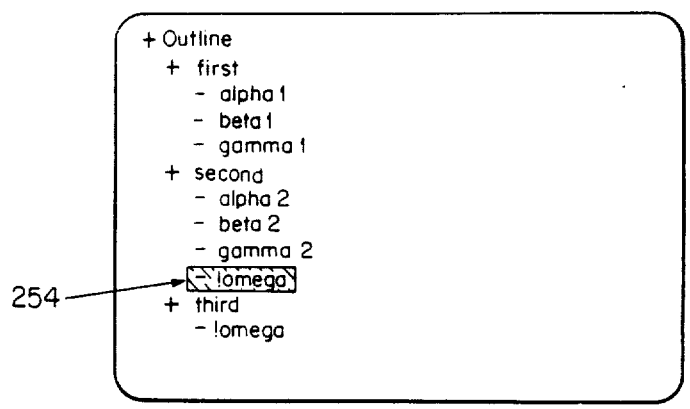

FIGS. 4a through 4h illustrate the creation and use of a global field in the outline definition phase of one embodiment of the Subject System. What is depicted are successive screens displayed in the global field routine. In FIG. 4a the category "second", here illustrated at 236 has several fields 238 in its definition. A space 240 is inserted into this category where a global field is to be inserted. This is done by pointer or cursor movement and highlighting with an inverse video mask. In one embodiment, the position is moved using the up and down arrow keys on the keyboard. It can be seen that this outline contains one global field 242 easily identified in the illustrated embodiment by the use of an "!" as the first character of the headline. In FIG. 4b, the "Global" 244 menu is displayed and the specific menu item "Set List" 246 is selected and highlighted on screen. The global field list 248 is then displayed, as in FIG. 4c. In this case, there is only one global field 242 defined in the database description as seen in FIG. 4a and therefore only one field value, "omega" is displayed as illustrated at 250. FIG. 4d shows how an asterisk(*) appears next to the global field name "omega" here illustrated 252 when the user presses the space key to select it, making it an element of the current global list. The user presses the Escape key (ESC) to return to the outline in this embodiment of the Subject System. FIG. 4e shows the still unchanged outline. In FIG. 4f, the user has inserted the global list, currently consisting of the single element "omega" into the previously created headline as illustrated at 254 in which the global value is highlighted. This is an operation accomplished by issuing a "CTRL-G" from the keyboard or selecting "GLOBALS/INSERT GLOBALS" from the menu of one embodiment of the system. In FIG. 4g, the user has moved up into another category, in this case "first" and inserted an empty headline 256 into this category by an appropriate keystroke entry. FIG. 4h displays the outline with the highlighted new field at 258 after the global field has been inserted once again.

GLOBAL FIELD-DATA ENTRY

Figure 5A:
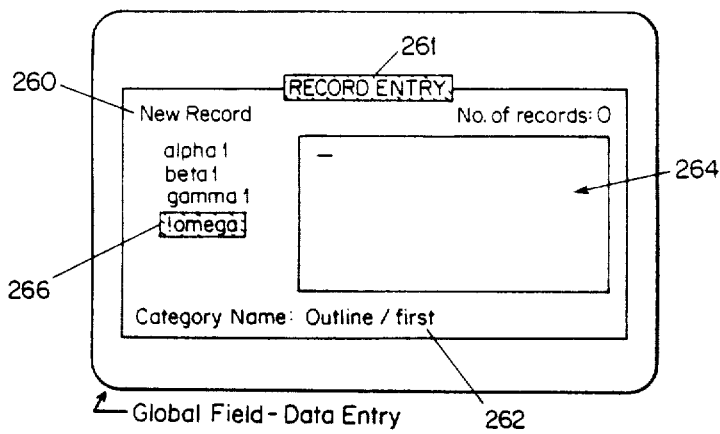
FIGS. 5-5k are diagrammatic illustrations showing successive screens indicating the use of the subject global field in the data entry process.

FIGS. 5a through 5k show the use of the global field during the data entry process in one embodiment. Referring to FIG. 5a, the data entry form 260 in the record entry mode highlighted at 261 displays the database category "OUTLINE/FIRST" at 262. A window 264 is provided which serves as a Record Entry Window or a Text Editing Window that includes many of the capabilities of a rudimentary word processor. A "field pointer" 266 is an inverse video mask over field names which is moved from field name to field name by pressing the TAB key on the keyboard entry device. In FIG. 5a the field pointer is pointing to the global field 266.

Global fields are either enabled or disabled during data entry, and the mode is changed through the use of menu item 268 i.e. "DISABLE/ENABLE". If disabled, a global field behaves exactly like a regular field in that data is entered by setting the field pointer on the field name and simply typing the data into the Edit Window.

If enabled, the global field "value" or data is to be entered into all records as they are created and must be entered in a special Edit Window in the global field editor.

Figure 5B:
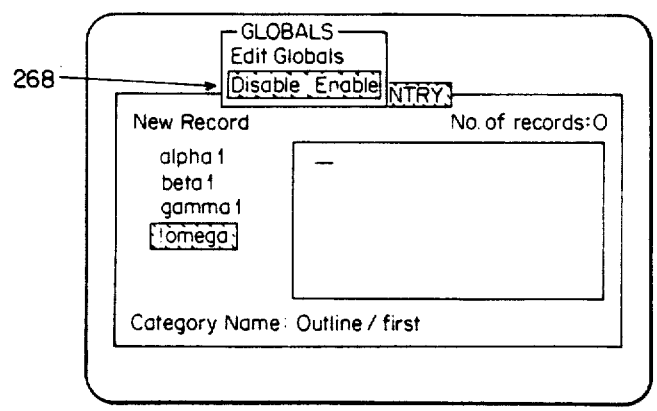
Figure 5C:
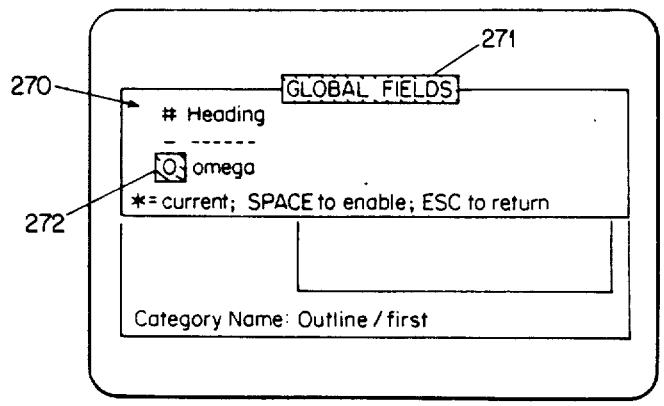
Figure 5D:
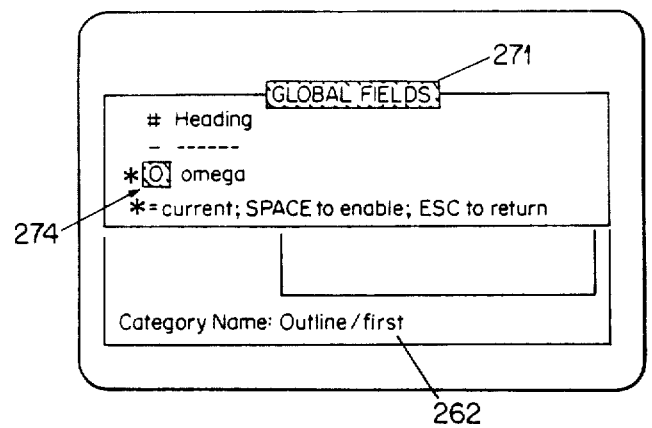
Figure 5E:
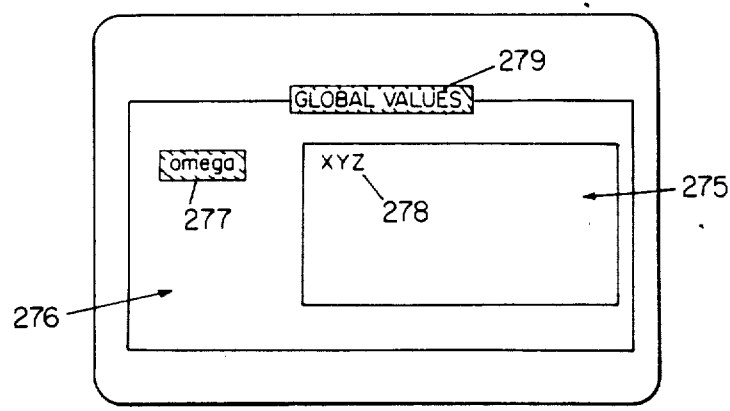
Figure 5F:
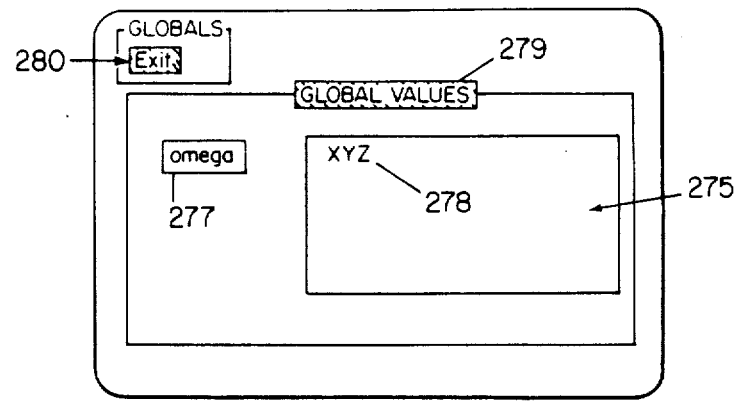
Figure 5G:
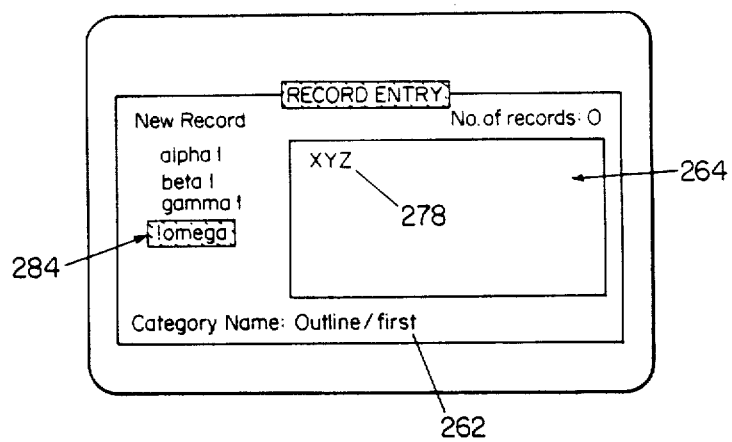

FIG. 5b shows the menu item "GLOBAL/DISABLE-ENABLE" 268 being selected. FIG. 5c shows the global field selection screen 270 and the highlighted "GLOBAL FIELDS" window label 271. In this example, there is only one global field 272, "omega". The space key is used to toggle the DISABLE/ENABLE setting and the asterisk appears when the field is enabled. In FIG. 5d the user has enabled "omega" and the asterisk 274 appears next to the field name. ESC, i.e., the escape key, allows the user to leave this screen, which presents the screen in FIG. 5e which displays the global value in the Global Edit window 275 and the enabled global field 277, as well as labeling the window with "GLOBAL VALUES" as shown at 279. For instance, the enabled global field is shown to be "OMEGA"; and the displayed global value is "XYZ". The user types in the text which will constitute the current global value 278 in window 275 and FIG. 5f shows the user selecting the "GLOBAL/EXIT" menu item highlighted at 280. In FIG. 5g, the global value 278 is displayed in the Edit Window 264 when the field pointer is set at the global field as illustrated at 284. This value will be inserted into all records created until it is changed explicitly in the global value editor or the global field is disabled.

Note, the user cannot type directly in the Edit Window 264 when a global field is enabled as indicated at 271 and the field pointer is on that global field.

Figure 5H:
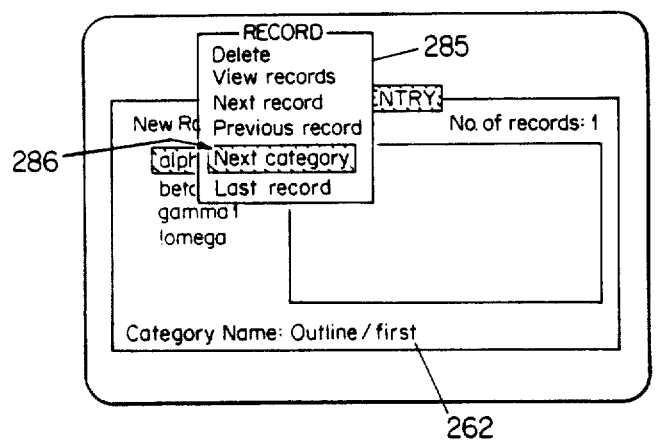
Figure 5I:
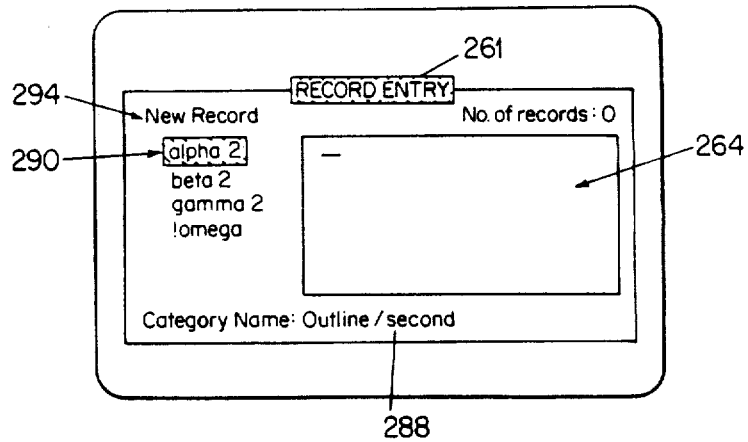
Figure 5J:
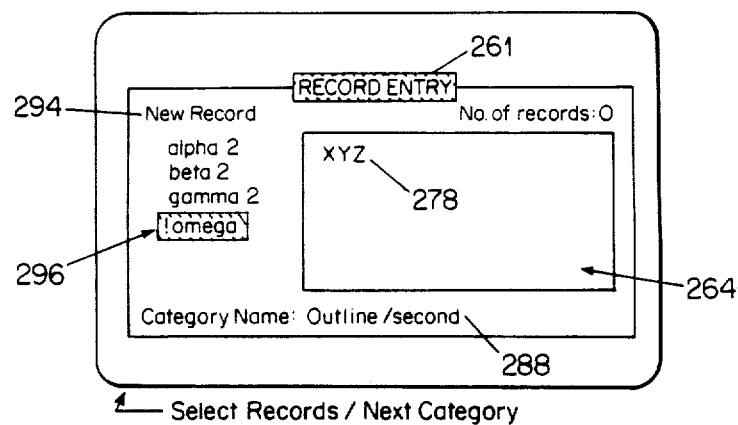
Figure 5K:
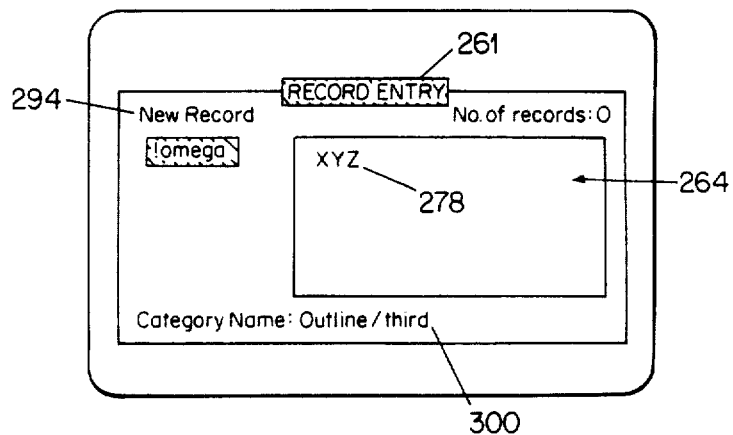

In FIG. 5h, the user selects the the Record menu 285 and menu item "RECORD/NEXT CATEGORY" as highlighted at 286. Selection of this menu item advances the user from the first category name 262, i.e., "OUTLINE/FIRST" to the data entry form of the next category or database defined by the outline. FIG. 5i shows that the Record Entry mode 261 is selected and that the data entry form of the next category 288 is "Outline/second". Note that the field pointer is on the first field name 290 and the Edit Window 264 is currently empty since the system is in a new record mode as illustrated at 294. In FIG. 5j, the user has advanced the field pointer to the global field 296 with the TAB key. Note that the Edit Window now displays the current global value 278. Next, the user has selected the "RECORD/NEXT CATEGORY" menu item and has advanced to the "Outline/third" 300 category of the outline as illustrated in FIG. 5k. Note that the current global value 278 is again displayed in the Edit Window 264.

In this manner a global field value can be inserted into all records created while the global is enabled and a value is set at the database that has that global field. This can help eliminate transposition and/or typing errors in data entry, in that once a global value has been established it will appear in all relevant records at the appropriate place and all with exactly the same text.

FIELD MAPPING

Figure 6A:
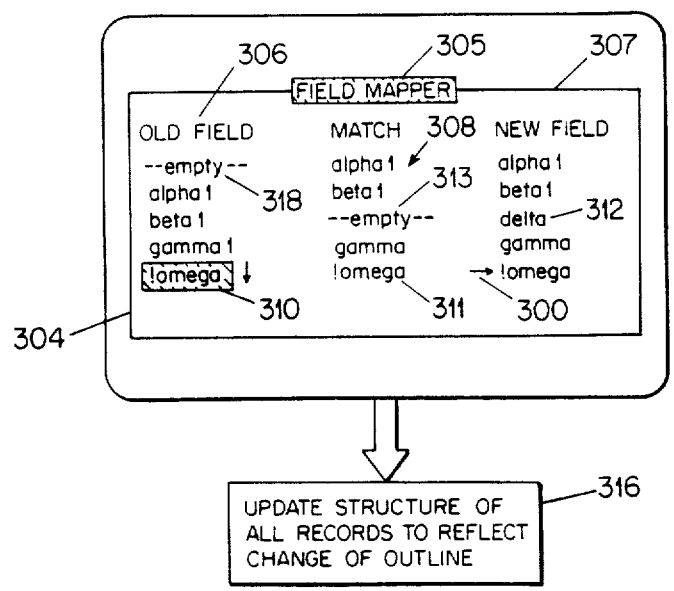
FIGS. 6a-6n are diagrammatic illustrations showing successive screens indicating the operation of the subject field mapper.
Figure 6B:
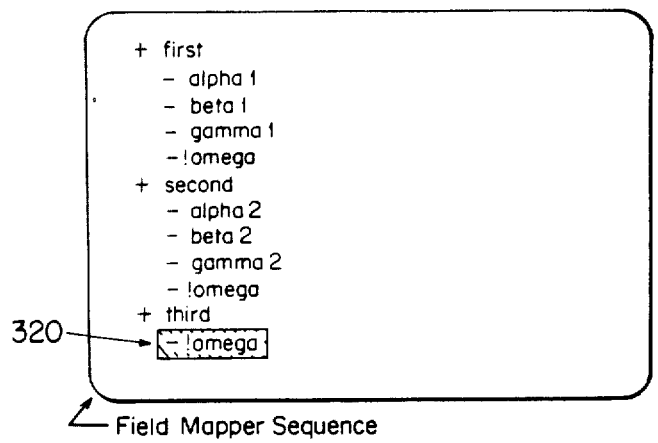
Figure 6C:
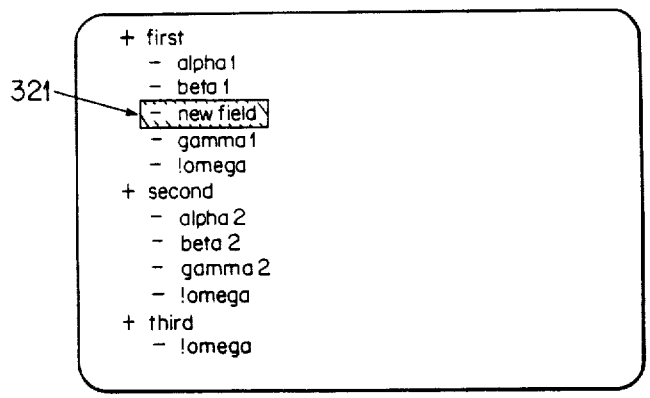
Figure 6D:
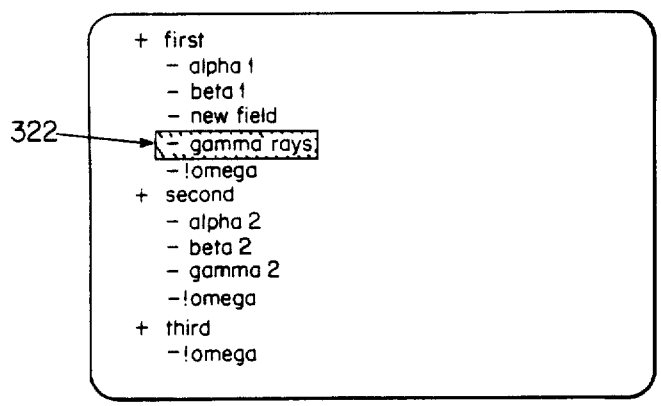
Figure 6E:
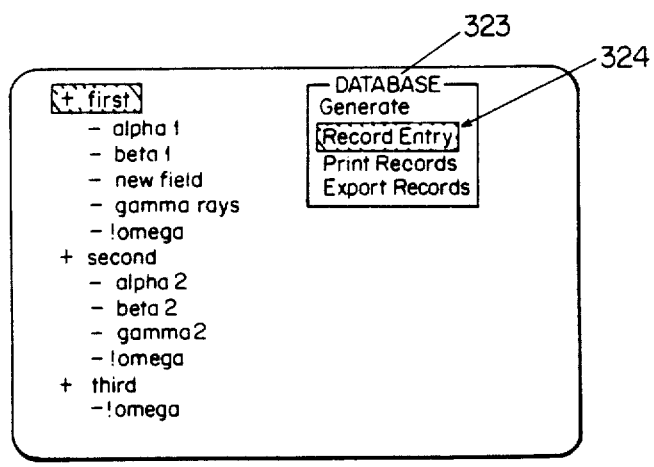
Figure 6I:
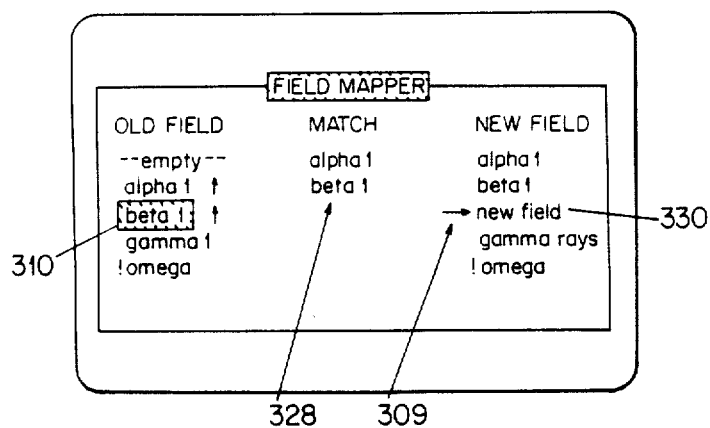
Figure 6J:
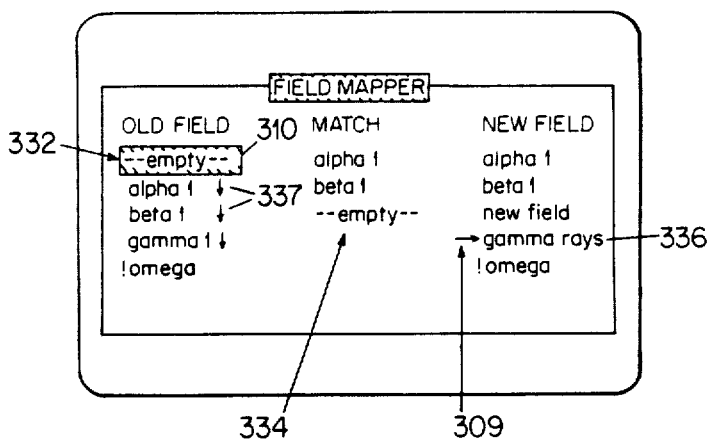
Figure 6K:
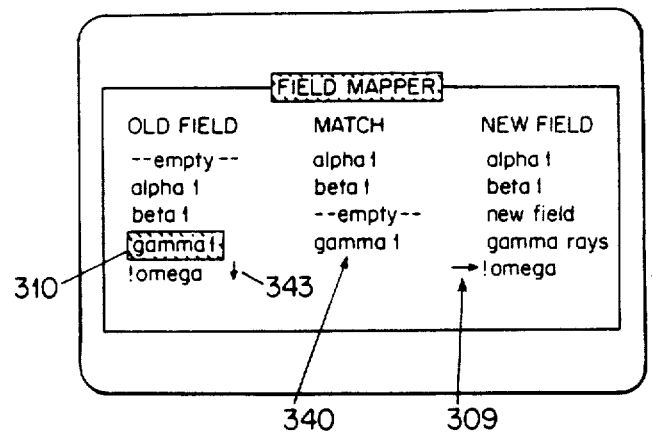
Figure 6F:
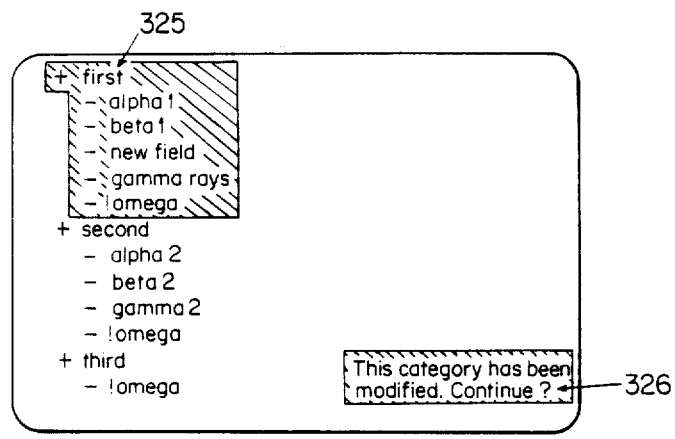
Figure 6G:
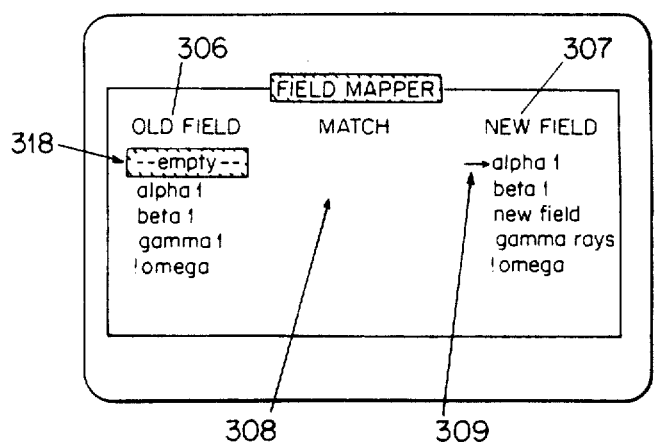
Figure 6H:
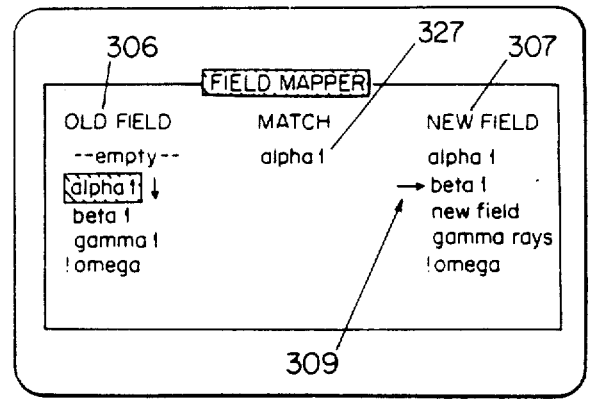
Figure 6L:
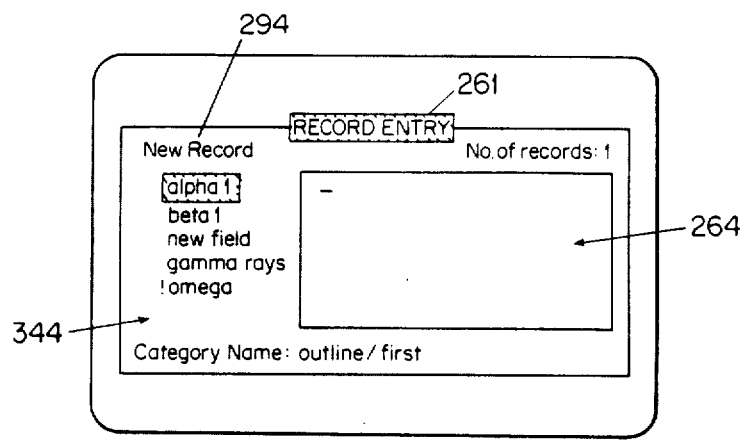
Figure 6M:
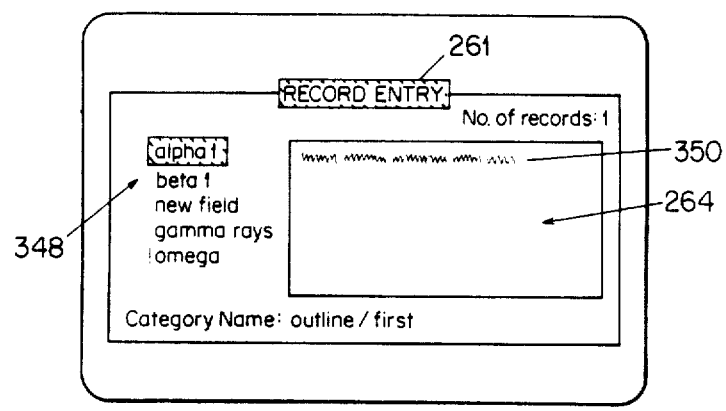
Figure 6N:
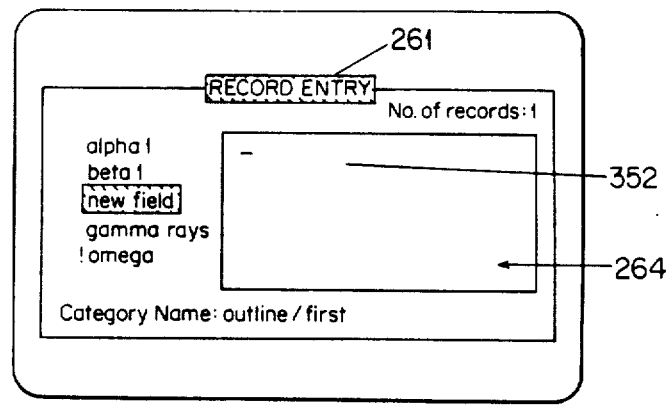

FIGS. 6a through 6n detail the operation of an embodiment of the subject field mapping system. This mechanism allows the outline description of databases to be edited after database generation and data entry have occurred. FIG. 6a shows the Field Mapping Screen 304 by way of introduction. Here, the field mapper mode is highlighted at 305, with the old field list displayed at 306, the proposed new field at 307, and a match column at 308. Here a cursor arrow 309 points to the new field entry, with the old field entry highlighted at 310. The match is shown at 311. In this screen "delta" is a new field shown at 312, and "--empty--" at 313 in the match column indicates no corresponding old field. This screen thus shows the relative positions of the old and new fields, whether there has been a new entry to the outline and where it is to be located in the outline. As will be seen, the order of the fields can be rearranged in the outline, or otherwise altered so that a revised outline can be created and checked prior to consequent record update and data entry as illustrated by box 316. An --empty-- is illustrated at 318 in old field column 306. This item is matched to any field that is entirely new and not just a change of position or name. FIG. 6b shows a sample outline for purposes of illustration. Note that the field pointer 320 is on the field "!omega". FIG. 6c shows that the user has moved the cursor, inserted a new line and typed in a new heading, in this case "new field" 321. In FIG. 6d it can be seen that the user has moved the cursor to the field formerly titled "gamma" and has now changed it to "gamma rays" as illustrated at 322. In FIG. 6e, the user selects the database menu 323 item 324 "DATABASE/RECORD ENTRY". This action automatically invokes the process described above in the discussion of FIGS. 3a and 3b. In this case, it is found that the outline definition has changed and so in FIG. 6f, the category in question is highlighted as shown at 325 and a message 326 is displayed. A positive reply to the request to continue invokes the field mapper, as seen in FIG. 6g.

Field mapping is a process of matching new field names to old in order to determine how record updating will be done on those records created under the previous database definition. FIG. 6g shows that the "Match" column is initially empty. The list 306 of "Old Fields" includes the highlighted non-field name "--empty--" 318. This item is matched to any field that is entirely new and not just a change in position or name. Note that pointer 309 initially points to the first field name in the list of 307 new fields. FIG. 6h shows "alpha 1" matched at 327 with "alpha 1" in the new field list 307. Note also that the pointer 309 is now moved down one position to the field name "beta 1". FIG. 6i shows the Field Mapper screen after "beta 1" has been matched with itself at 328. Note that the field pointer 309 is now on "new field" illustrated at 330. At this point the "old field" highlighter 310 moves upwardly as shown by arrows 331, until the highlighting cursor reaches the --empty-- notation at the head of the old field list as seen in FIG. 6j at 332, and "--empty--" is matched with "new field" at 334. Now the new field pointer 309 is moved to "gamma rays" as shown at 336. FIG. 6k shows the old field cursor 310 on "gamma 1". Here "gamma 1" is matched with "gamma rays" at 340 and the new field pointer 309 is at "!omega". In a similar manner, the old field name "!omega" is matched with "!omega" in the new field list as highlighted cursor 310 is brought down as illustrated by arrow 343. Once satisfied with the outline as checked by the field mapper, the outline changes are reflected in the automatically updated records and database category definition. Thus upon keyboard command in FIG. 6l, the system proceeds directly to the data entry form 344 as indicated by Record Entry mode 261. Note that the system is ready to except a new record as illustrated at 294. Previously created records can be viewed by pressing "PAGEUP". FIG. 6m shows one such record 348. Note that the value 350 in the first field is preserved in the Record Editing Window 264 by the field mapping process. FIG. 6n shows that the field mapper inserted "new field" but the field is empty in this record 352 window 264.

The ability to freely change the structure of a database definition repeatedly is a crucial feature in a system meant for complex textual information. The field mapper aids this process by allowing the user to make any selected mapping in a highly defined manner and forces confirmation before changes are made to the database records. This forces the user to explicitly enter the exact changes to be made in the database structure when the outline is initially changed and an attempt is made to enter data in the records. The user is informed that the category has been modified and is asked if he wishes to continue. If yes then the field mapper is called and the user is then forced to explicitly define the changes in the database structure with the aid of mapping display.

Figure 7:
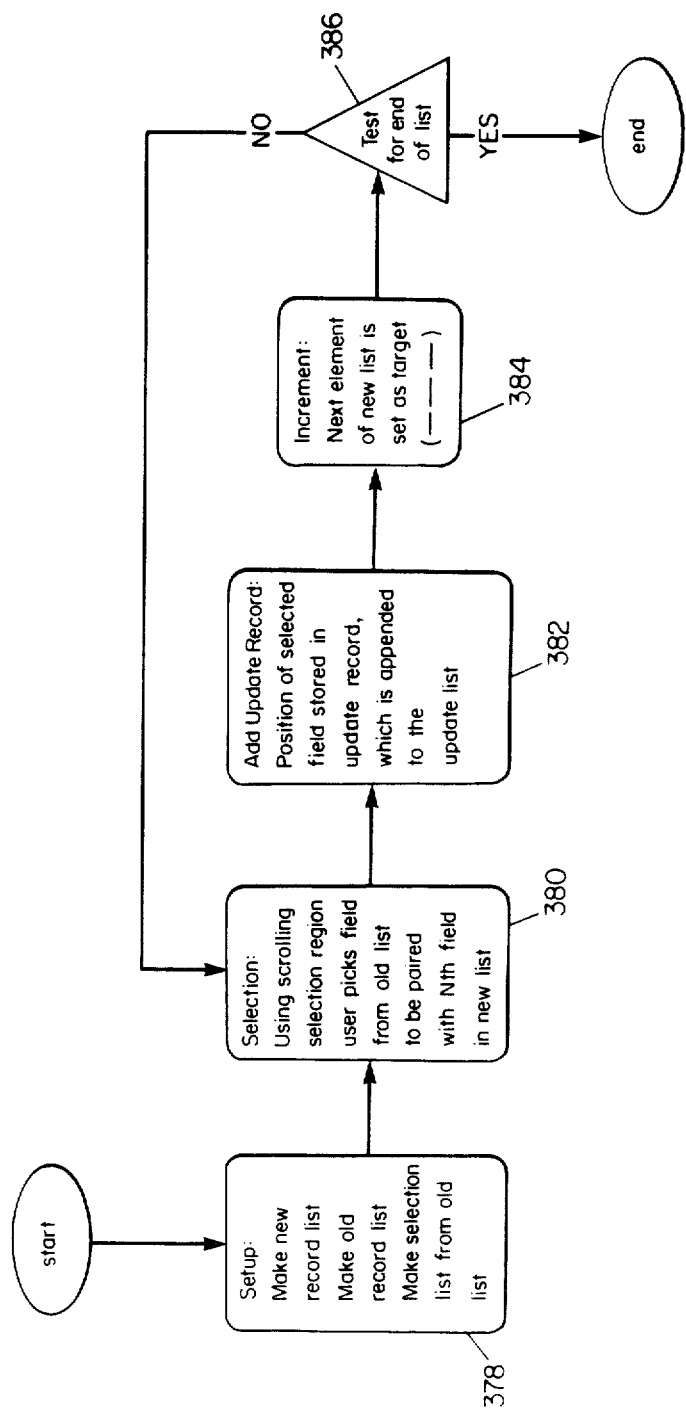
FIG. 7 is a flow diagram of the field mapping process.

FIG. 7 is a flow diagram of the routine controlling the field mapping process. After setup as illustrated at 378, the user picks a field from the old list to be paired with the "nth field" in the new list in a selection process as illustrated at 380. The position of the selected field stored in the update record is appended to the update list at 382. As illustrated at 384, the next step increments to the next element of the list to be set as the target in the list of "new fields". The test for the end of list step as illustrated at 386 either returns to selection process 380 or passes control to the system which updates records to reflect the changes.

Figure 8:
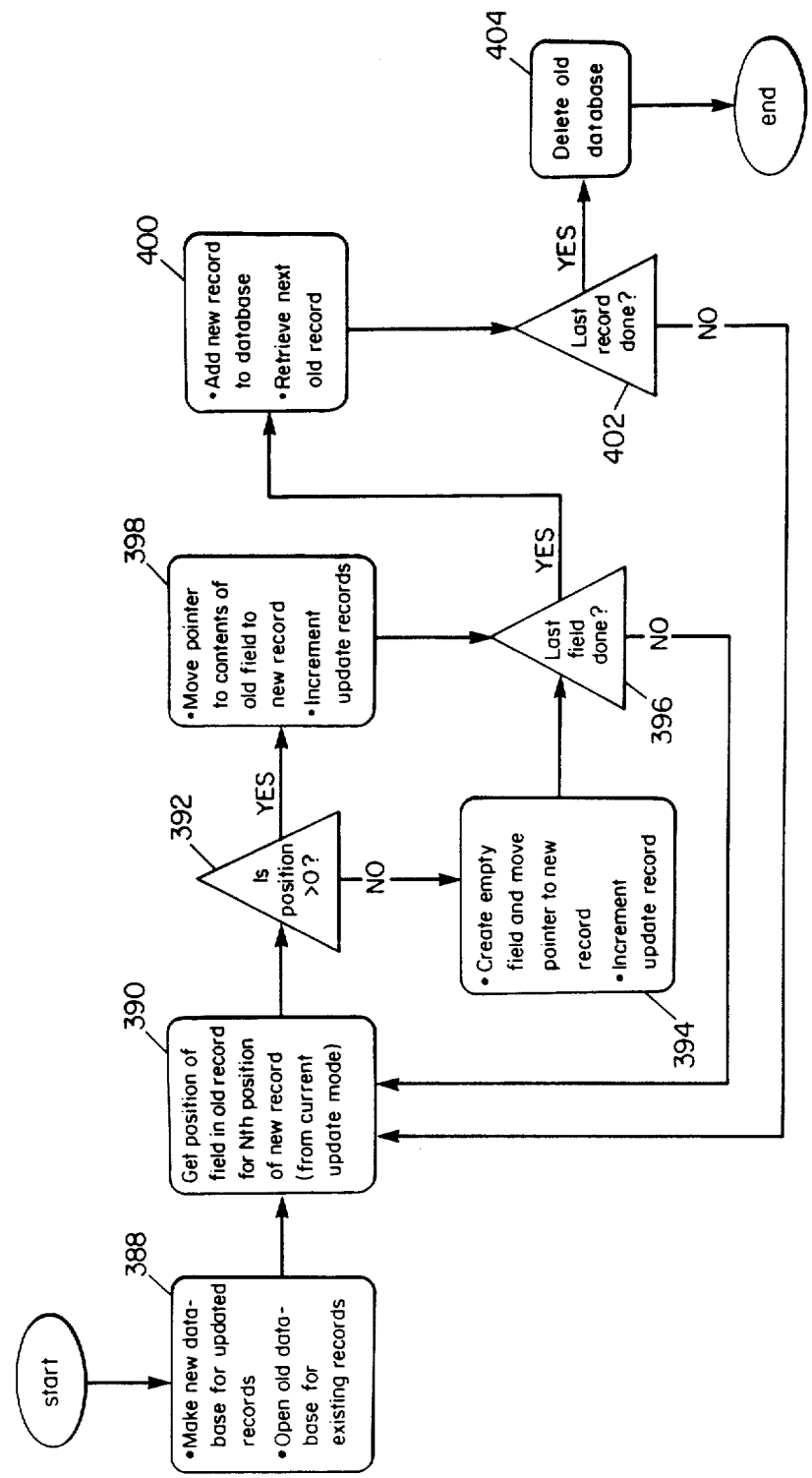
FIG. 8 is a flow diagram of the updating process of database records called upon successful completion of the field mapping process.

FIG. 8 is a flow diagram of the update record process after a successful field mapping operation. The process starts as illustrated at 388 by creating a new database to receive the update records and opening the old database for the existing records. Next, as illustrated at 390, the system obtains the position of a field in the old record for the "nth" position, starting at 1, of the new record. The system then determines if the field is new at 392 by determining if the position is greater than zero. If not and the field is new as illustrated at 394, the system creates an empty field and moves the pointer to a new record, increments the update record and determines in the last field that it has been done as illustrated at 396. If not, the process is repeated at 390. If the position is greater than zero as determined at 392, the system moves the pointer to the contents of the field of the new record and increments the update record as illustrated at 398; and tests to see if it is the last field as illustrated at 396. The process is repeated at 390 if it is not the last field as determined at 396. When the last field is processed at 400 the system add the new record to the new database and retrieves the next oldest record, if one exists as illustrated at 402. After repeating the process for all the records, the old database is deleted as illustrated at 404 and the updating process finishes.

Figure 9:
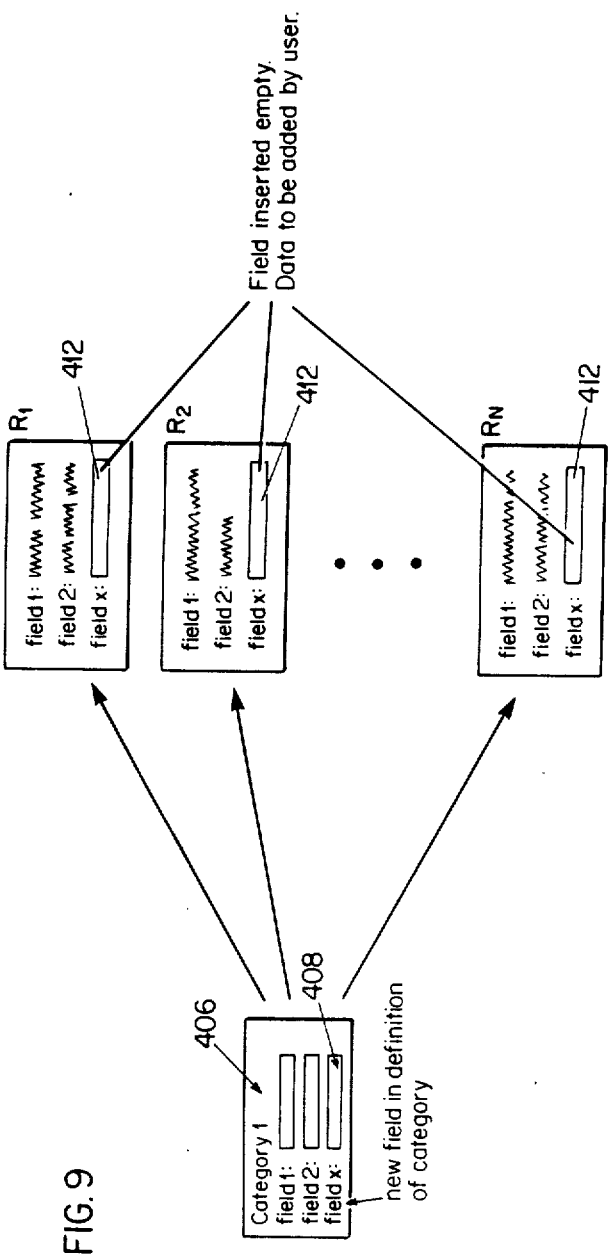
FIG. 9 is a diagrammatic illustration showing the record updating process when a new field, i.e., "field x", is inserted into previously created records after a field mapping process.

FIG. 9 shows a data entry form 406 in which a new field 408 has been inserted, called "field x". Records R1 through Rn are shown after the updating process has inserted the new field "field x" into records 412, but no data has yet been inserted into the records. The data for the new field must be specifically entered by the user or these fields remain empty in the records. What this figure shows is that "field x" is automatically inserted into all records associated with category 1 at the appropriate place. If there are numerous records associated with category 1, the Subject System assures that the repetitive entry is made. This eliminates errors in that when it comes time to give "field x" a value in a record, the record will come up with "field x" at the appropriate place, from whence its value can be entered. Thus no relevant record will be skipped, since each relevant record will have a "field x" blank indicating need for a value if one is desired.

RETRIEVAL

Figure 10A:
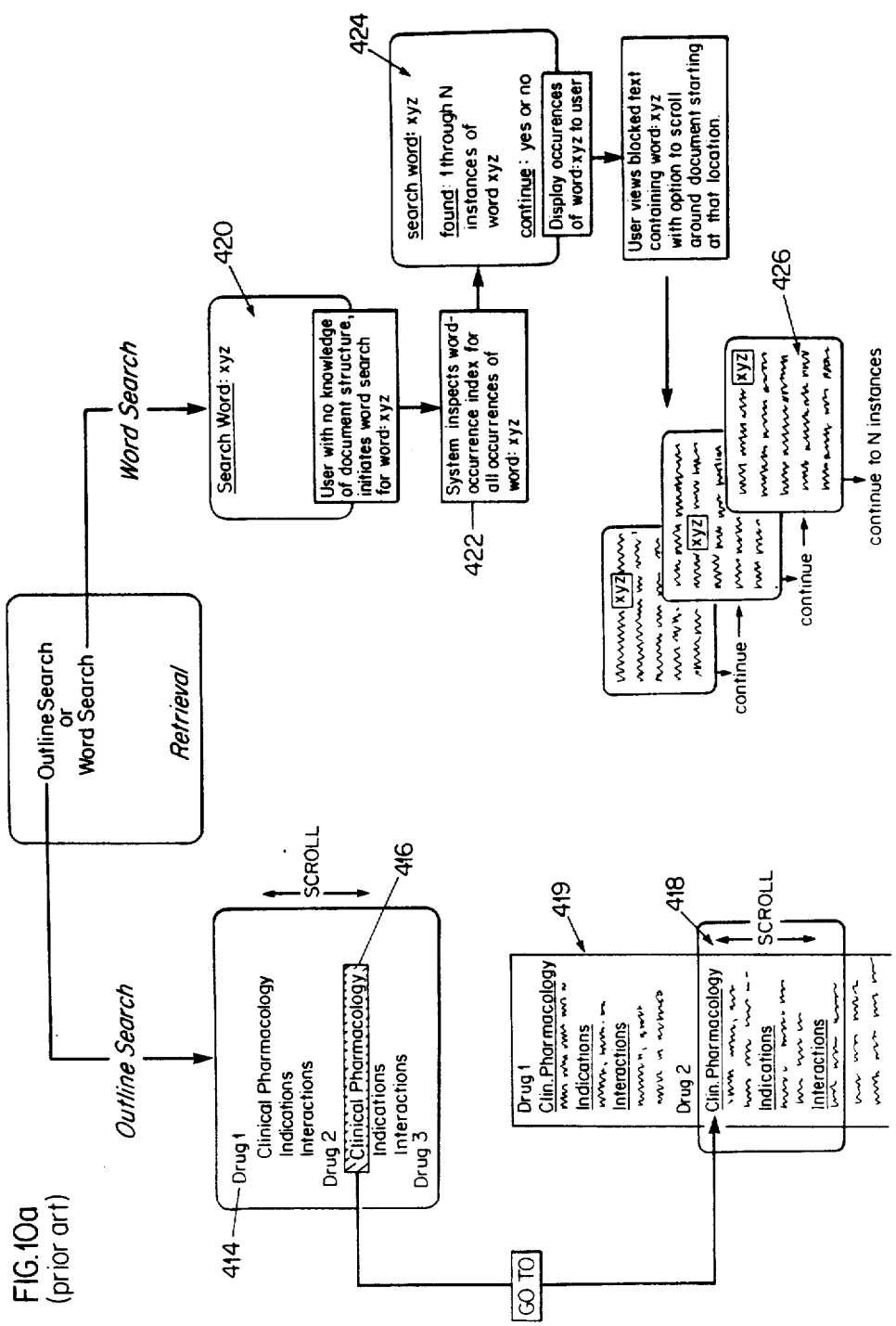
FIG. 10a is a diagrammatic representation illustrating prior art outline search and word search retrieval systems.

FIG. 10a is an illustration of two prior art retrieval methods. Outline searches as illustrated at 414 are really only of service in the preparation of hardcopy documents. Any outline is typically displayed on the screen and the user positions the cursor 416 on the headline of the section he wishes to edit. Some sort of "Go To" command is given to the system and the system scrolls through the entire linear document until the system positions the document display at that part 418 of document 419. From there, the user must scroll around the document or return to the outline to relocate himself within the document. This method of retrieval is completely different from the subject system. The FIG. 10a system assumes a document, as in word processing, not a set of database records. An outline item here is a headline of a block of text in a document, whereas an outline item in the subject system is a field name in a database with multiple records.

The other major prior-data retrieval method illustrated in FIG. 10a is the word search method commonly utilized in full-text database systems. This type of retrieval does not rely on the user having any prior knowledge of the structure of the underlying information. The user simply enters a word for the system to search for at 420, the system either searches a prefabricated word occurrence index or searches through the text as illustrated at 422 and displays to the user the number of occurrences found at 424, if a word occurrence index is utilized. The user can then as illustrated at 426 view occurrences in the document. In this type of system, it is common for the user to have to sort through several blocks of extraneous information until the user finds the information he's looking for.

Figure 10B:
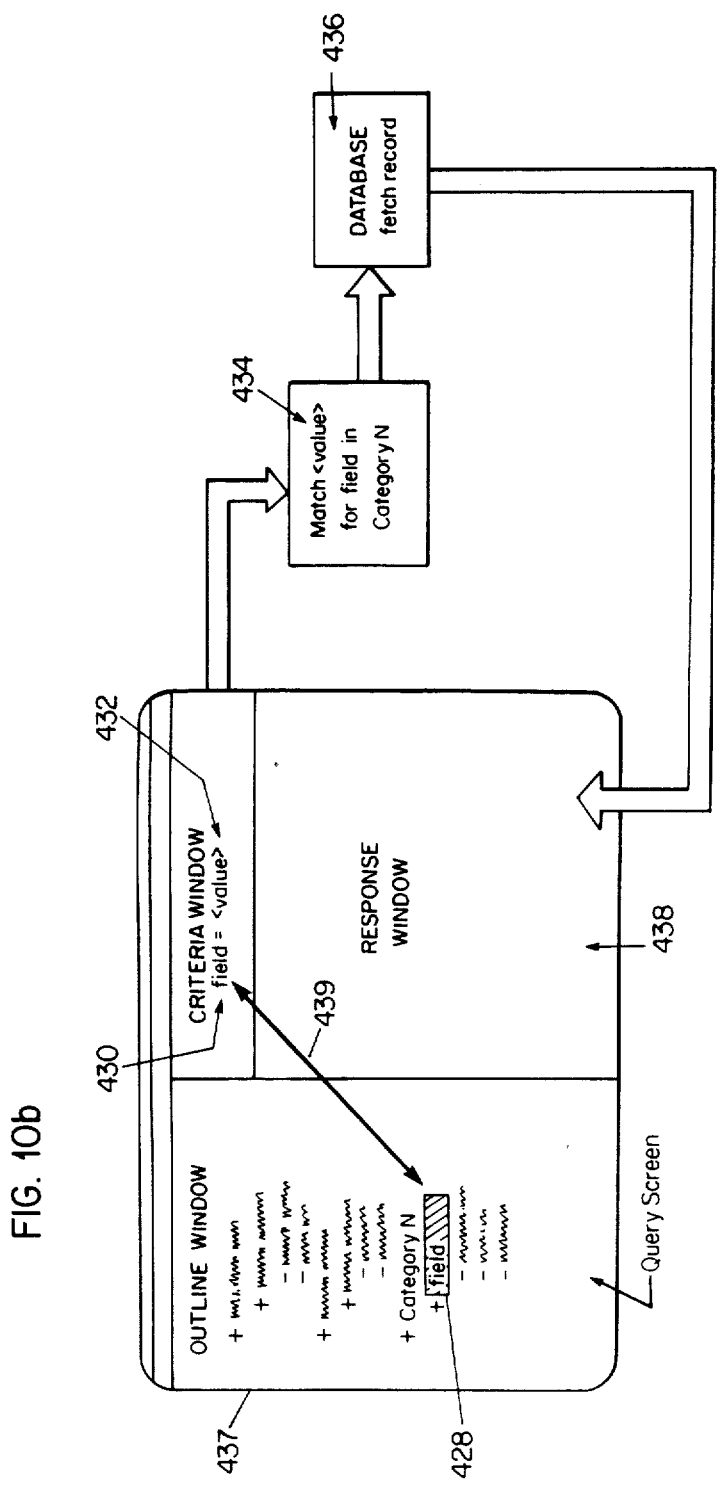
FIG. 10b is a diagrammatic illustration of the subject query process, illustrating a constantly presented outline in an Outline Window and highlighting of the Criteria Window field in the outline.

In contradistinction and referring now to FIG. 10b, this illustrates the method of data retrieval implemented in the subject invention. In general, the user positions the cursor 428 on a field in the outline for a given database and initiates the query by issuing a command such as "DATABASE/QUERY" at the keyboard of FIG. 1. The criteria field placed in the Criteria Window 430 is that field on which the cursor is positioned in outline 437. The user then assigns a criteria value 432 for the criteria field. The system then examines a word occurrence index 434 which contains the category, record, field and offset into the field for each word in the database, for an occurrence which matches the criteria set by the user. By "offset" is meant the number of characters from the beginning of the field value at which the criteria word occurs. If none are found, the user is notified "Word not Found". If at least one occurrence is found, the system fetches all the records containing the occurrences from the database 436 and displays them in the Response Window 438. The user can freely page through the record occurrences and then return to the outline to initiate another query.

This database querying system thus does not require a document wide search required by a full-text system in which the entire database must be searched. Nor does it simply display the single block of text within a document as in outline/document preparation system.

It will be noted that one's place in the outline is continually available during retrieval in the Outline Window as illustrated by the highlighted cursor 428 and it corresponds to the field in the Criteria Window as illustrated by arrow 439. This convenient display is one part of the subject invention.

Figure 11:
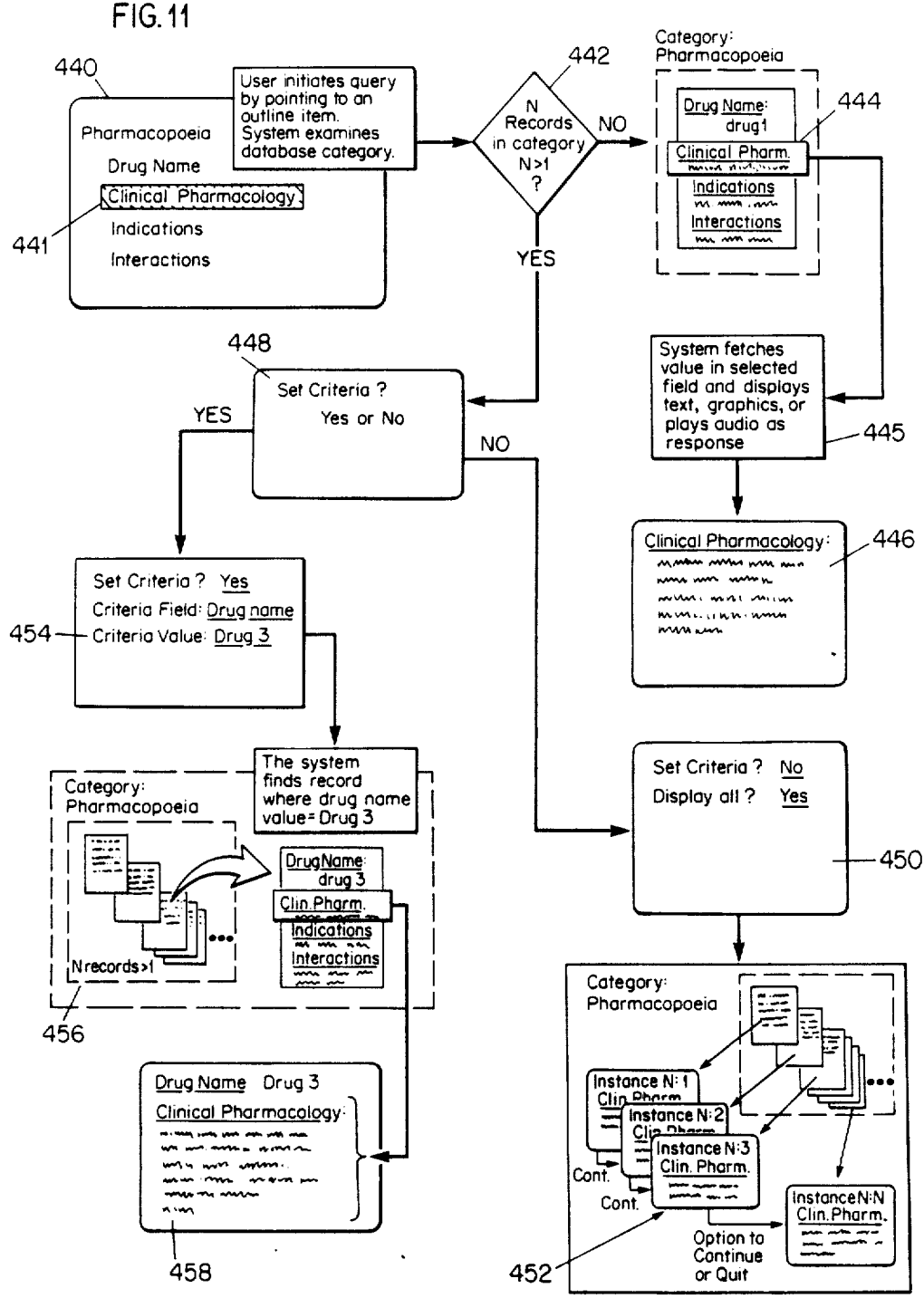
FIG. 11 is a flow diagram of various query methods in an embodiment of the subject invention.

Referring now to FIG. 11, this figure illustrates in a more graphic format the query process in the subject invention. Here a pharmacopoeia example is useful and is given for illustrative purposes only.

The user initiates a query by pointing to an outline 440 item 441. The system determines whether a database contains more than one record at 442. If there is only one record, the system fetches at 445 the indicated field from the database record 444 and displays the field as the response to the query at 446. If at 442 the indicated database contains more than one record, the system asks at 448 if the user wants to set a criteria for the query. If not, the system asks at 450 if it should display all the records of a database. In one embodiment of the system, the user can cease this mode of "record browsing" at any point as illustrated at 452. If the user wishes to set a query criteria at 448, a criteria field and criteria value are set by the user at 454. The system finds the record 456 in the indicated database which matches the criteria field and value established by the user and fetches the field 458 indicated when the query was initiated, in this case also displaying the set criteria. This system thus has the advantages of rapidly retrieving information in exactly the desired context.

Figure 12A:
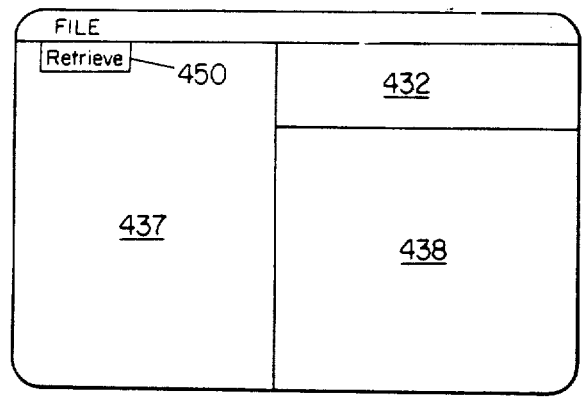
FIGS. 12a-12g are diagrammatic illustrations of screens showing one type of query system for the subject invention; and, FIG. 13 is a diagrammatic illustration showing data retrieval in which a global field is the criteria field, also showing the associated truncation of the outline to only those categories in which the global field contains the criteria value.
Figure 12B:
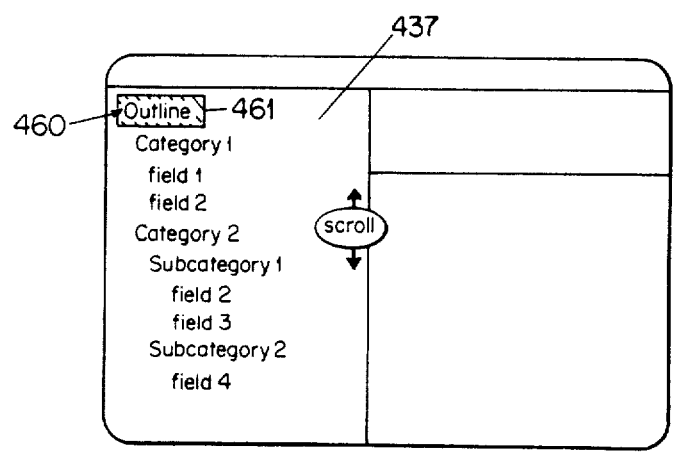
Figure 12C:
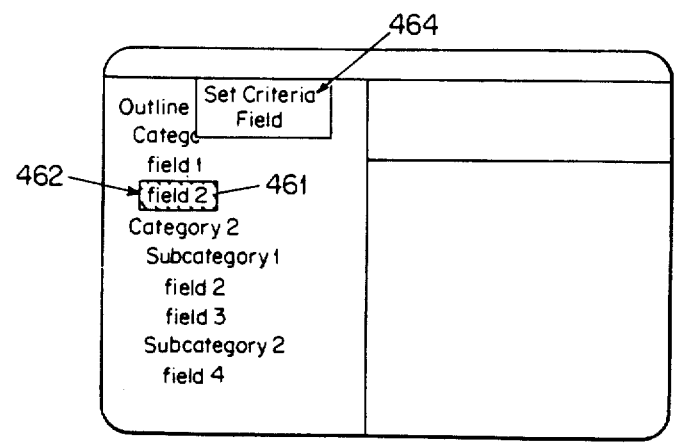
Figure 12D:
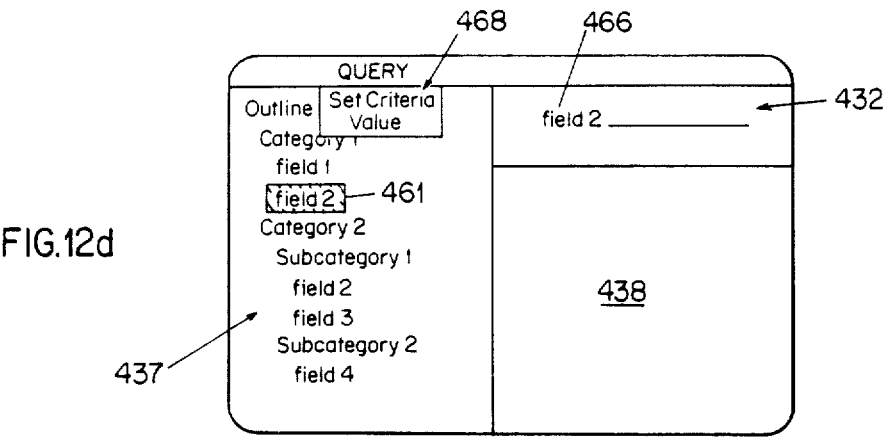
Figure 12E:
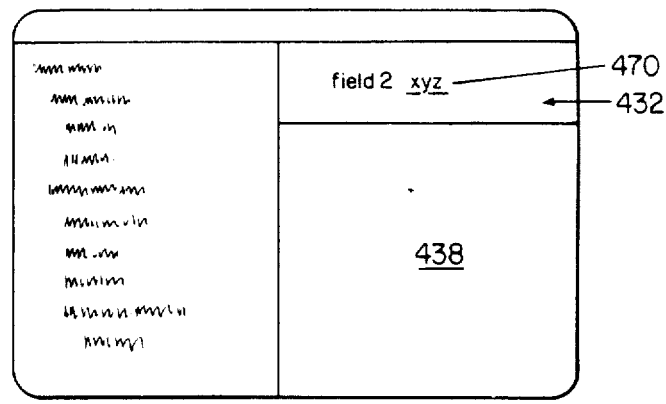
Figure 12F:
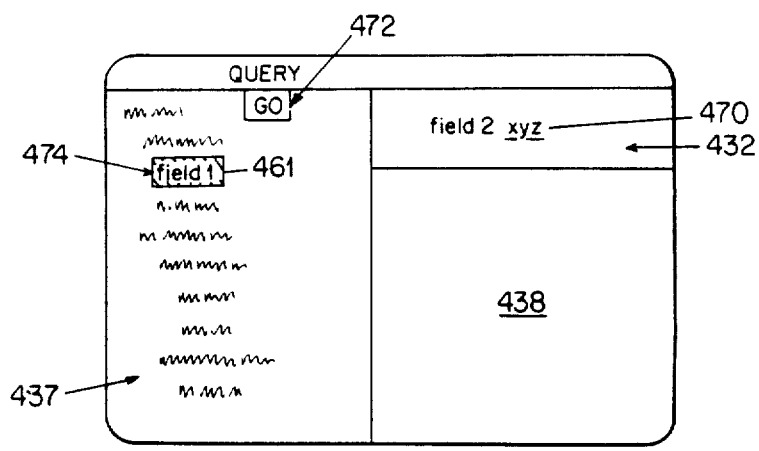
Figure 12G:
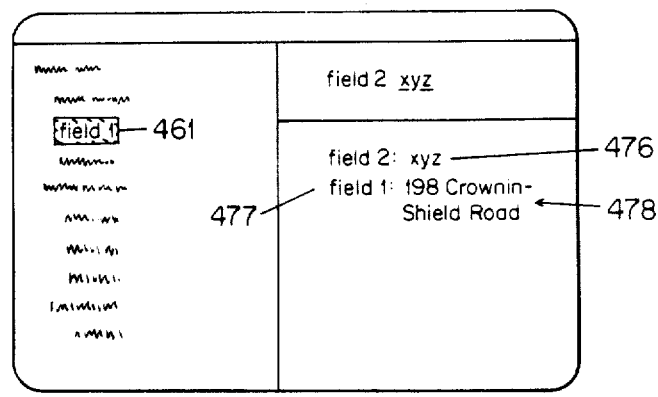

More particularly, FIG. 12a through 12g describes the operation of the query system in greater detail. In FIG. 12a, the user retrieves a database from off-line storage by entering a retrieve command as illustrated at 459. The outline 460 appears in the Outline Window 437 in FIG. 12b with the cursor positioned on the first item of the outline. The cursor moves freely from item to item in the list by simply using arrow keys to move or utilizing a pointing device for input, such as a "mouse". The user positions the highlighted cursor 461 on "field 2" at 462 in FIG. 12c and selects via keystroke "QUERY/SET CRITERIA FIELD" at 464 to initiate a query. FIG. 12d shows the selected outline item at 466, i.e., "field 2" in the Criteria Window 432 at 466 and the user issuing a "QUERY/SET CRITERIA VALUE" command which is depicted at 468. In FIG. 12e, the criteria value 470 may be set to "xyz" as shown in the Criteria Window 432. FIG. 12f shows a "QUERY/GO" command 472 being issued by the user with the outline cursor 461 on the query or response field "field 1" shown at 474. The system searches for an occurrence of the word "xyz" within field 2 of the database category "Category 1", when it locates a record in which this requirement is fulfilled, it displays the contents of "field 1", the query field in the same records as the occurrence of "xyz" in field 2, the criteria field. For instance if "field 2" is the "name" field and "xyz" is the name; and field 2 is the "street address" field. Then what is displayed in FIG. 12g is, for instance, person "xyz" address 198 Crowninshield Road. FIG. 12g shows first the criteria field and value at 476 and then the query field at 477 and its value 478 from the same record in which the criteria field contains at least one occurrence of the criteria value. The subject query system thus allows the outline to function as a query interface, or opposed to menu prompts or programming language with the outline eliminating the need for remembering the structure of the databases.

Figure 13:
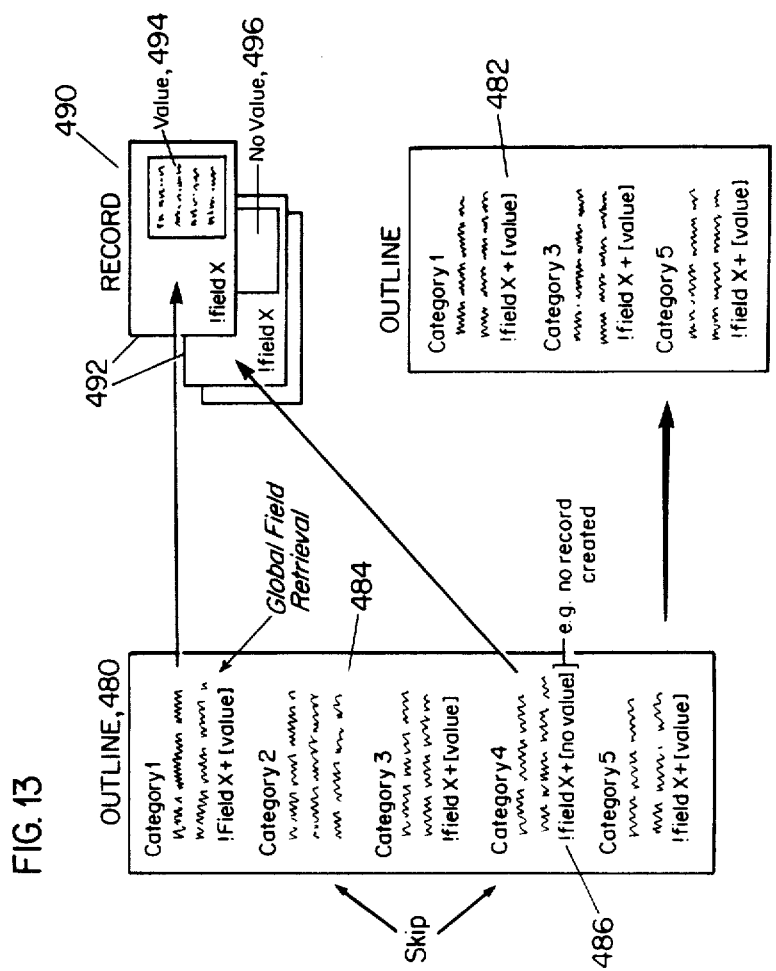

FIG. 13 illustrates the special case retrieval involving the use of the global field as the criteria field. When the global field "!Field x" in outline 480 is set as the criteria value, there is an option in one embodiment of the system which examines the database records and displays at 482 only the categories and fields in the outline which include at least one occurrence of the criteria value in the global field specified as the criteria field. This option allows the user to selectively narrow the search to only those areas of the database containing the specified global criteria. Thus, for instance, category 2 is skipped as illustrated at 484 because there is no "field x"; and category 4 is skipped as illustrated at 486 because "field x" has no value. This results in truncated outline 482 being presented on screen which leaves out any extraneous outline entries and permits easier conceptualization for retrieval. Note, as shown at 490 records 492 containing "field x" may have a value assigned as illustrated at 494; or no value as illustrated at 496.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for creating a database for a database management system comprising:
   a CPU;
   means coupled to said CPU for storing one or more database files, each file having large numbers of records, with each of said records corresponding to entered data, said records being stored in said storing means in accordance with corresponding file structure;
   display means coupled to said CPU;
   means coupled to said CPU for creating an outline comprising category and field definitions; and
   means coupled to said outline creating means for automatically generating data entry forms having categories and field definitions corresponding to those of said outline, and for generating files having corresponding category and field definitions, whereby data entry into the records of said database can proceed based on said outline, and further including means coupled to said display means and said file generating means, and responsive to said automatic data entry forms generation for displaying a selected data entry form, for entering data into the file corresponding to said selected form and for displaying said data such that data is displayed along with the category and field of said selected form, said system further including field mapping means coupled to said display means and responsive to a change in said outline representing a change from an old outline to a new outline for displaying a field map of said old outline, said new outline and a mapping function to define the relationship between said old outline and said new outline, wherein said field mapping means includes means for generating a prompt after a successful user-authorized field mapping operation, means for updating files in accordance with changes in said outline, and means for enabling said data entry means only after a field mapping operation and a prompt from said field mapping means.

* * * * *